United States Patent
Sohn et al.

(10) Patent No.: US 10,040,883 B2
(45) Date of Patent: Aug. 7, 2018

(54) MULTIMODAL POLYOLEFIN RESIN AND MOLDED PRODUCT PREPARED THEREFROM

(71) Applicant: DAELIM INDUSTRIAL CO., LTD., Seoul (KR)

(72) Inventors: Byung-Keel Sohn, Daejeon (KR); Seung-Tack Yu, Osan-Si (KR); Sang-Won Yoo, Daejeon (KR); Young-Jae Jun, Daejeon (KR); Sah-Mun Hong, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 426 days.

(21) Appl. No.: 14/501,468

(22) Filed: Sep. 30, 2014

(65) Prior Publication Data

US 2015/0017365 A1 Jan. 15, 2015

Related U.S. Application Data

(63) Continuation of application No. PCT/KR2013/002618, filed on Mar. 29, 2013.

(30) Foreign Application Priority Data

Mar. 30, 2012 (KR) .................. 10-2012-0033525

(51) Int. Cl.
  *C08F 10/00* (2006.01)
  *C08F 210/16* (2006.01)
  (Continued)

(52) U.S. Cl.
  CPC ............ *C08F 210/16* (2013.01); *C08F 10/02* (2013.01); *C08L 23/04* (2013.01); *C08L 23/06* (2013.01);
  (Continued)

(58) Field of Classification Search
  CPC ......... C08F 10/02; C08F 2/001; C08F 210/16
  (Continued)

(56) References Cited

U.S. PATENT DOCUMENTS

| 4,461,873 A | 7/1984 | Bailey et al. |
| 4,530,914 A | 7/1985 | Ewen et al. |

(Continued)

FOREIGN PATENT DOCUMENTS

| CN | 1545536 | 11/2004 |
| CN | 1894038 | 1/2007 |

(Continued)

OTHER PUBLICATIONS

SIPO, Office Action of CN 201380018667.8 dated Dec. 16, 2015 and its English translation.

(Continued)

*Primary Examiner* — Ellen S Wood
(74) *Attorney, Agent, or Firm* — Lex IP Meister, PLLC

(57) ABSTRACT

Multimodal polyolefin resin having excellent characteristics such as moldability, mechanical strength, external appearance and a polyolefin resin molded product are disclosed. The polyolefin resin satisfies all requirements of following (1) to (5), (1) density (d): 0.934 to 0.963 g/cm$^3$, (2) melt flow index (MIE, 190° C., 2.16 kg load condition): 0.01 to 1.0 g/10 minutes, (3) ratio of weight-average molecular weight (Mw) and number-average molecular weight (Mn) measured by Gel Permeation Chromatography (GPC) (Mw/Mn, Molecular weight distribution (MWD)): 12 to 60, (4) at least two peaks appear when the molecular weight of the polyolefin resin is measured with GPC, and (5) amount of polyolefin having Mw of 10,000 or less exceeds 15 weight % and amount of polyolefin having Mw of 1,000,000 or more exceeds 1.5 weight %, when the molecular weight of the polyolefin resin is measured with GPC.

7 Claims, 5 Drawing Sheets

(51) Int. Cl.
*C08F 10/02* (2006.01)
*C08L 23/04* (2006.01)
*C08L 23/06* (2006.01)
*C08L 23/08* (2006.01)
*C08F 4/659* (2006.01)
*C08F 4/6592* (2006.01)

(52) U.S. Cl.
CPC ....... *C08L 23/0807* (2013.01); *C08L 23/0815* (2013.01); *C08F 4/65916* (2013.01); *C08F 4/65925* (2013.01); *C08F 4/65927* (2013.01); *C08L 2205/025* (2013.01); *C08L 2207/068* (2013.01); *C08L 2308/00* (2013.01); *C08L 2314/06* (2013.01); *Y10T 428/139* (2015.01); *Y10T 442/60* (2015.04)

(58) Field of Classification Search
USPC .............................. 428/34.7, 35.1; 526/241
See application file for complete search history.

(56) References Cited

U.S. PATENT DOCUMENTS

| | | | |
|---|---|---|---|
| 4,659,685 | A | 4/1987 | Coleman, III et al. |
| 4,808,561 | A | 2/1989 | Welborn, Jr. |
| 4,935,474 | A | 6/1990 | Ewen et al. |
| 4,937,299 | A | 6/1990 | Ewen et al. |
| 5,183,867 | A | 2/1993 | Welborn, Jr. |
| 5,266,544 | A | 11/1993 | Tsutsui et al. |
| 5,395,810 | A | 3/1995 | Shamshoum et al. |
| 5,539,076 | A | 7/1996 | Nowlin et al. |
| 5,747,405 | A | 5/1998 | Little et al. |
| 6,841,631 | B2 | 1/2005 | Loveday et al. |
| 6,894,128 | B2 | 5/2005 | Loveday et al. |
| 2002/0160908 | A1 † | 10/2002 | Mink |
| 2003/0149162 | A1 | 8/2003 | Ahlstrand |
| 2005/0054790 | A1 † | 3/2005 | Mawson |
| 2006/0038315 | A1 | 2/2006 | Tunnel, III |
| 2006/0281867 | A1 | 12/2006 | Jaker |
| 2008/0312380 | A1 | 12/2008 | Kwalk |
| 2009/0036610 | A1 | 2/2009 | Jaker |
| 2009/0246433 | A1 | 10/2009 | Michie et al. |
| 2010/0121006 | A1 | 5/2010 | Cho |
| 2010/0129579 | A1 | 5/2010 | Ashbaugh |
| 2010/0133714 | A1 | 6/2010 | Jaker |
| 2010/0291334 | A1 † | 11/2010 | Cann |
| 2011/0120587 | A1 | 5/2011 | Anker et al. |
| 2012/0041164 | A1 † | 2/2012 | Kolb |

FOREIGN PATENT DOCUMENTS

| | | |
|---|---|---|
| EP | 0676418 A1 | 10/1995 |
| EP | 0705848 A2 | 4/1996 |
| EP | 0747402 A1 | 12/1996 |
| EP | 0717755 B1 | 2/1999 |
| EP | 2072589 A1 | 6/2009 |
| WO | 96/13532 A1 | 5/1996 |
| WO | 2003020821 | 3/2003 |
| WO | 2005068076 | 7/2005 |
| WO | 2006065651 A2 | 6/2006 |

OTHER PUBLICATIONS

SIPO, Office Action of CN 201380018667.8 dated Feb. 13, 2017 and its English translation.

† cited by third party

MULTIMODAL POLYOLEFIN RESIN AND MOLDED PRODUCT PREPARED THEREFROM

REFERENCE TO RELATED APPLICATIONS

This is a continuation of pending International Patent Application PCT/KR2013/002618 filed on Mar. 29, 2013, which designates the United States and claims priority of Korean Patent Application No. 10-2012-0033525 filed on Mar. 30, 2012, the entire contents of which are incorporated herein by reference.

FIELD OF THE INVENTION

This invention relates to a multimodal polyolefin resin and a molded product prepared with the same, and more particularly, to a multimodal polyolefin resin having superior characteristics such as moldability, mechanical strength, external appearance, and so on and a polyolefin resin molded product.

BACKGROUND OF THE INVENTION

In order to use a polyolefin resin for a particular application, polyolefin resin should have superior toughness, strength, environmental stress and crack resistance etc, Such characteristics can be easily improved by increasing molecular weight of the polyolefin resin (polymer), however, the moldability of the polyolefin resin is deteriorated as the molecular weight thereof is increased. Due to such disadvantage of polyolefin resin, it is preferable to use a polyolefin resin having uniform physical property while adjusting the structure of the polymer or using a suitable processing aid, rather than using a mixture of polyolefin resins each having different physical properties. However, generally the polyolefin resin prepared with Zeigier-Natta and metallocene catalyst has narrow molecular weight distribution. Thus, if used alone, various problems may occur. When the polymer having broad molecular weight distribution or multimodal molecular weight distribution is used, the moldability of the polyolefin resin can be improved with maintaining characteristics of toughness, strength, environmental stress and crack resistance etc., thereby solving the disadvantage of the polyolefin resin having narrow molecular weight distribution.

The polyolefin having multimodal molecular weight distribution is a polyolefin containing at least two components each having different molecular weight, and for example, includes a high molecular weight component and a low molecular weight component in relatively proper proportions. Many studies have been conducted for the preparation of a polyolefin having broad molecular weight distribution or multimodal molecular weight distribution. One method among them is a post-reactor process or a melting blending process in which polyolefin having at least two different molecular weights are blended before or during the processing of the polyolefin. For example, U.S. Pat. No. 4,461,873 discloses a blending method of physically bending two different kinds of polymers for preparing a bimodal polymer blend. When such a physical blending method is used, it is liable to produce a molded form having high gel component, a product appearance is deteriorated owing to the gel component, and thus the polyolefin cannot be used for the films. Further, the physical blending method requires a complete uniformity, so there is a disadvantage of the preparing cost being increased.

Another method for preparing polyolefin having multimodal molecular weight distribution, for example bimodal molecular weight distribution is to use a multistage reactor which includes two or more reactors. In the multistage reactor, a first polymer component having one molecular weight distribution among two different molecular weight distribution of the bimodal polymer, is prepared in a certain condition at a first reactor, the first polymer component prepared is transferred to a second reactor, and then a second polymer component having different molecular weight distribution from that of the first polymer component, is prepared in a different condition from that of the first reactor, at the second reactor. The above-mentioned method solves the problems relating to the gel component, but it uses the multistage reactor, so the production efficiency may be decreased or the production cost may be increased. Also, when the high molecular weight components are prepared in the first reactor, the low molecular weight components are not prepared in the second reactor and thus the finally manufactured polyolefin particles may be made only by the high molecular weight components.

Still another method for preparing polyolefin having broad molecular weight distribution or multimodal molecular weight distribution is to polymerize the polyolefin by using a mixture of catalysts in a single reactor. Recently, in the pertinent art, the various attempts have been made for producing polyolefin having broad molecular weight distribution or multimodal molecular weight distribution, by using two or more different catalysts in a single reactor. In this method, the resin particles are uniformly mixed in a level of sub-particles, thus the resin components each having different molecular weight distribution exists in a single phase. For example, U.S. Pat. Nos. 4,530,914 and 4,935,474 disclose a method for preparing polyolefin having broad molecular weight distribution by polymerizing ethylene or more higher alpha-olefins in the presence of a catalyst system comprising two or more metallocenes each having different propagation and termination rate constants and alumoxane. Further, U.S. Pat. Nos. 6,841,631 and 6,894,128 disclose a method for preparing polyethylene having bimodal or multimodal molecular weight distribution by using a metallocene-type catalyst comprising at least two metal compounds and the usage of the polyethylene for manufacturing films, pipes, hollow molded articles and so on. Polyethylene produced in this way has a good processability, but the dispersed state of the polyethylene component in the molecular weight per unit particle is not uniform, so there are disadvantages of rough appearance and unstable physical properties even in relatively good processing conditions.

U.S. Pat. No. 4,937,299 discloses a method for preparing polyolefin by using a catalyst system comprising at least two kinds of metallocenes each having different reactivity ratio with respect to monomer to be polymerized. U.S. Pat. No. 4,808,561 discloses a method for preparing olefin polymerization supported catalyst by reacting metallocene with alumoxane in the presence of a carrier. The metallocene is supported in the carrier to form solid power catalyst. As the carrier, inorganic oxide materials such as silica, alumina, silica-alumina, magnesia, titania, zirconia and the mixture thereof, and resinous materials such as polyolefin (for example, finely divided polyethylene) can be employed, and the metallocenes and alumoxanes are deposited on the dehydrated carrier material.

Generally, since the polymer prepared with Zeigier-Natta catalyst alone or metallocene catalyst system has a narrow molecular weight distribution, it is not made to prepare the satisfactory polyolefin which has a multimodal molecular weight distribution or broad molecular weight distribution. Accordingly, in the related art, a method has been known for preparing a bimodal resin by using a mixture catalyst system containing Zeigier-Natta catalyst and metallocene catalyst components. The mixture catalyst system typically includes a combination of heterogeneous Ziegler-Natta catalysts and homogeneous metallocene catalyst. The mixture catalyst system is used for preparing the polyolefin having a broad molecular weight distribution or bimodal molecular weight distribution, to adjust the molecular weight distribution and polydispersity of the polyolefin.

U.S. Pat. No. 5,539,076 discloses a mixture catalyst system of metallocene/non-metallocene for preparing a specific bimodal high-density copolymer. The catalyst system is supported by an inorganic carrier. The carrier such as silica, alumina, magnesium-chloride and the mixture catalyst of Zeigier-Natta and metallocene are disclosed in U.S. Pat. No. 5,183,867, European publication No. 0676418A1, European Patent No. 0717755B1, U.S. Pat. No. 5,747,405, European publication No. 0705848A2, U.S. Pat. No. 4,659,685, U.S. Pat. No. 5,395,810, European publication No 0747402A1, U.S. Pat. No. 5,266,544 and WO 9613532A1 etc. The mixture catalyst of Zeigier-Natta and metallocene supported has relatively low activity than single uniform catalyst, so it is difficult to prepare polyolefin having properties suitable for a specific use. In addition, since polyolefin is prepared in a single reactor, the gel which is generated in the blending method may be produced, it is difficult to insert comonomer to high molecular weight components part, the form of polymer produced may be poor and further two polymer components may not be uniformly mixed, so the quality control of the produced polyolefin may be difficult.

SUMMARY OF THE INVENTION

Therefore, it is an object of the present invention to provide a multimodal polyolefin resin having molecular weights, molecular weight distribution and shear response (SR) which are suitable for processing or molding.

It is other object of the present invention to provide a multimodal polyolefin resin in which extrusion load is relatively low and extrusion amount is relatively high in a forming process so that productivity of molded product is superior.

It is another object of the present invention to provide a polyolefin resin molded product having excellent appearance and mechanical strength.

In order to achieve these objects, the present invention provides a polyolefin resin satisfying all requirements of following (1) to (5);

(1) density (d): 0.934 to 0.963 g/cm3, (2) melt flow index (MIE, 190° C., 2.16 kg load): 0.01 to 1.0 g/10 minutes, (3) ratio of weight-average molecular weight (Mw) and number-average molecular weight (Mn) measured by Gel Permeation Chromatography (GPC) (Mw/Mn, Molecular weight distribution (MWD)): 12 to 60, (4) at least two peaks appear when the molecular weight of polyolefin resin is measured with GPC, and (5) the amount of polyolefin having weight-average molecular weight (Mw) of 10,000 or less exceeds 15 weight % and the amount of polyolefin having weight-average molecular weight (Mw) of 1,000,000 or more exceeds 1.5 weight %, when the molecular weight of polyolefin resin is measured with GPC.

Further, the present invention provides a molded product produced with the above-mentioned polyolefin resin.

Molded product of polyolefin resin having good moldability, mechanical strength and external appearance can be produced from the multimodal polyolefin resin according to the present invention. The polyolefin resin according to the present invention can be used not only for manufacturing various molded products such as a blow molded product, an inflation molded product, a cast molded product, an extrusion lamination molded product, an extrusion molded product of pipes or mold release, a foam molded product, an injection molded product etc. but also for manufacturing fibers, monofilaments, non-woven fabric etc.

DETAILED DESCRIPTION OF THE INVENTION

Figure 1:
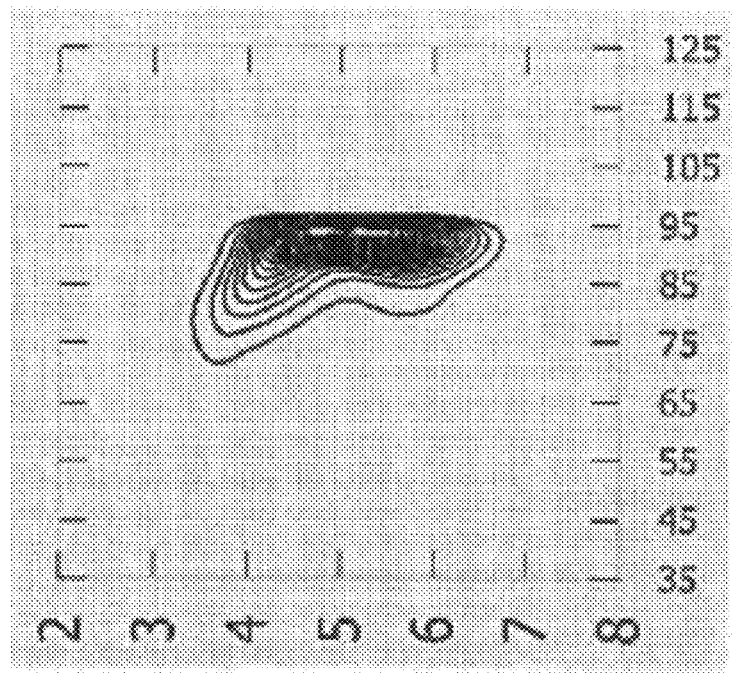
FIG. 1 to FIG. 3 show CFC (Cross-Fractionation Chromatography) data of polyethylene obtained at Example 1 to Example 3 of the present invention, respectively.

A more detailed description of the invention will be made by reference to the attached drawings. In the following description, if necessary, the polyolefin resin may be called as simply polymer or polyolefin, or ethylene-based polymer, polymer, olefin polymer etc.

The multimodal polyolefin resin according to the present invention, as the polyolefin resin having a broad molecular weight distribution, for example, bimodal or multimodal molecular weight distribution, has good moldability. So the molded product produced from the same has a good mechanical strength and appearance. The polyolefin resin is prepared so as to satisfy all requirements of following (1) to (5), thus having good moldability.

(1) density (d): 0.934 to 0.963 g/cm$^3$ (2) melt flow index (MIE, 190° C., 2.16 kg load condition): 0.01 to 1.0 g/10 minutes, preferably 0.03 to 0.8 g/10 minutes (3) ratio of weight-average molecular weight (Mw) and number-average molecular weight (Mn) measured by Gel Permeation Chromatography (GPC) (Mw/Mn, Molecular weight distribution (MWD)): 12 to 60, preferably 13 to 50, more preferably 15 to 30

(4) at least two peaks appear when the molecular weight of polyolefin resin is measured with GPC (5) the amount of polyolefin having Mw of 10,000 or less exceeds 15 weight %, preferably more than 20 weight %, and the amount of polyolefin having Mw of 1,000,000 or more exceeds 1.5 weight %, preferably more than 2.0 weight %, when the molecular weight of polyolefin resin is measured with GPC.

The Mw of the polyolefin resin according to the present invention (measured by GPC method) is preferably 100,000 to 400,000, more preferably 120,000 to 300,000. When the molecular weight of the present polyolefin resin is analyzed with GPC method, at least two peaks appear, preferably, one peak (NU indicating smallest molecular weight appears at 20,000 g/mol or less, and the other peak ($M_{Hp}$) indicating largest molecular weight appears between 100,000 g/mol and 400,000 g/mol. The polyolefin forming the peak ($M_{Hp}$) of largest molecular weight improves physical property and melting strength of the polymer resin while the polyolefin forming the peak ($M_{LP}$) of smallest molecular weight improves the moldability of the polymer resin. Thus, when the molecular weight of the polyolefin is out of the above-mentioned range, the moldability of the polyolefin resin may be decreased and the physical property of the molded product from the same may be degraded.

Further, it is preferable that the polyolefin resin of the present invention satisfies following requirements (1) and/or (2) when being analyzed with CFC (Cross-Fractionation Chromatography) method. The CFC was carried out for analyzing fine structure of the polyolefin. A polyolefin amount eluted, a molecular weight of the eluted polyolefin and a molecular weight distribution thereof were measured in each temperature interval while increasing the temperature of the samples. The function and operation of the CFC were detail described in Macromol. Symp. 2007, 207, 13-28.

(1) At least two peaks appear in TREF (temperature rising elution fractionation) elution test.

(2) The amount of component eluted at 80° C. or less is 8 weight % or more, preferably 10 weight % or more, in TREF (temperature rising elution fractionation) elution test.

Also, preferably, the polyolefin resin of the present invention has shear response (SR) of 50 to 300, flow activation energy (Ea) of 25 to 30 kJ/mol, and melt tension of 3.0 to 10 gf measured at 230° C.

As olefin monomer constituting the polyolefin according to the present invention, linear aliphatic olefin of 2 to 12, preferably 2 to 10 carbon atoms, cyclic olefins of 3 to 24, preferably 3 to 18 carbon atoms, dienes, trienes, styrenes, and so on can be used. Example of the linear aliphatic olefin includes ethylene, propylene, butene-1, pentene-1,3-methylbutene-1, hexene-1,4-methylpentene-1,3-methylpentene-1, heptene-1, octene-1, decene-1,4,4-dimethyl-1-pentene, 4,4-diethyl-1-hexene, 3,4-dimethyl-1-hexene, or so on. Example of the cyclic olefins include cyclopentene, cyclobutene, cyclohexene, 3-methylcyclohexene, cyclooctene, tetracyclodecene, octacyclodecene, dicyclopentadiene, norbonene, 5-methyl-2-norbonene, 5-ethyl-2-norbonene, 5-isobutyl-2-norbonene, 5,6-dimethyl-2-norbonene, 5,5,6-trimethyl-2-norbonene, ethylene norbonene, and so on. The preferable dienes and trienes include a polyene of 4 to 26 carbon atoms having two or three double bonds. Specific examples of the dienes and the trienes include 1,3-butadiene, 1,4-pentadiene, 1,4-hexadiene, 1,5-hexadiene, 1,9-decadiene, 2-methyl-1,3-butadiene, and so on. Preferable examples of the styrenes include styrene or substituted styrene substituted with an alkyl group of 1 to 10 carbon atoms, alkoxy group of 1 to 10 carbon atoms, a halogen group, an amine group, a silyl group, halogenated alkyl group and so on. The olefin monomers may be polymerized to form a homo-polymer, an alternating copolymer, a random copolymer or a block copolymer.

Preferably, the polyolefin resin of the present invention is a homo-polymer or copolymer selected from a group of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbonadiene, ethylidene norbornene, phenyl norbornene, vinyl norbornene, dicyeclopentadiene, 1,4-butadiene, 1,5-butadiene, 1,5-pentadiene, 1,6-hexadiene, styrene, alpha-methylstyrene, divinylbenzene and 3-chloromethylstyrene. Further, the polyolefin resin of the present invention includes a main component which is selected from a group of ethylene, propylene and mixture thereof and an auxiliary component. It is preferable to contain 0.01 to 3.0 weight % of structural unit derived from α-olefin of 4 to 10, for example 6 to 8 carbon atoms, as the auxiliary component. Here, the amount of comonomer (α-olefin) can be measured with 13C-NMR.

The polyolefin resin according to the present invention can be used not only for manufacturing various molded products such as a blow molded product, an inflation molded product, a cast molded product, an extrusion lamination molded product, an extrusion molded product of pipes or mold release, a foam molded product, an injection molded product, sheets, films etc. but also for manufacturing fibers, monofilaments, non-woven fabric etc. Specifically, the present polyolefin resin is useful for producing the blow molded product, the extrusion molded product of mold release or film and is suitable for manufacturing the pipes such as a pipe for heating (a pipe for circulating heating water). The present polyolefin may be cross-linked during the molding process, and the molded product contains a molded composite (laminate) whose one part is made of the polyolefin according to the present invention and whose another part is made of different resin. For improving the physical properties of the molded product, conventional additives, modifiers and so on can be added.

When a pipe is formed with the present polyolefin, it is preferable that the molded pipe satisfies the following requirements (1) and (2).

(1) pipe fail time should be greater than 200 hours in a hydraulic pressure endurance test in which stress corresponding to the pressure of 3.7 Mpa is applied on the pipe by using water at 95° C. according to KS M ISO 1167 and the pipe fail time is measured.

(2) pipe fail time should be more than 50 hours in a hydraulic pressure endurance test in which stress corresponding to the pressure of 3.9 Mpa is applied on the pipe by using waters at 95° C. according to KS M ISO 1167 and the pipe fail time is measured.

The present polyolefin resin can be prepared by a proper combination of respective components in a catalyst composition. The catalyst composition comprises at least one organometallic compound and a first at least one organic transition metal compound which are the catalysts for expressing the polymer having relatively low molecular weight, a second at least one organic transition metal compound which is the catalyst for expressing the polymer having relatively medium and high molecular weight, and aluminoxane. The at least one organometallic compound is represented by following Formula 1, the first at least one organic transition metal compound is represented by following Formula 2, and the second at least one organic transition metal compound is represented by following Formula 3.

$$M^1R^1{}_lR^2{}_mR^3{}_n \qquad \text{Formula 1}$$

$$M^2R^4{}_pX_q \qquad \text{Formula 2}$$

$$[R^5\text{-}Q\text{-}R^6]M^2X_2 \qquad \text{Formula 3}$$

In Formulas 1, 2 and 3, M1 is an element of Group 1, 2, 12, 13 or 14 in the Periodic Table, $M^2$ is titanium (Ti), zirconium (Zr) or hafnium (Hf), $R^1$, $R^4$, $R^5$, and $R^6$ each is independently a cyclic hydrocarbyl group of 5 to 30 carbon atoms having at least 2 conjugated double bonds, $R^2$ and $R^3$ are independently a hydrocarbyl group of 1 to 24 carbon atoms, X is a halogen atom, l is an integer of 1 to the valence of $M^1$, m and n are independently an integer of 0 to 2, and l+m+n is equal to the valence of $M^1$; p is an integer of 0 to 2, q is an integer of 2 to 4, p+q is equal to the valence of $M^2$, Q is a divalent group selected from $(CR^7_2)_b$, $(SiR^7_2)_b$, $(GeR^7_2)_b$, $NR^7$ or $PR^7$ which connects $R^5$ and $R^6$, wherein substituents $R^7$ are independently hydrogen atom, hydrocarbonyl group of 1 to 20 carbon atoms, b is an integer of 1 to 4, when Q is $(CR^7_2)_b$, $(SiR^7_2)_b$, $(GeR^7_2)_b$, two substituents $R^7$ connected to carbon (C), silicon (Si), germanium (Ge) can be connected to each other to form a ring of 2 to 7 carbon atoms.

First, the organometallic compound of Formula 1 will be explained. $M^1$ in Formula 1 is an element of Group 1, 2, 12, 13 or 14 in the Periodic Table, and exemplary includes lithium (Li), sodium (Na), potassium (K), magnesium (Mg), zinc (Zn), boron (B), aluminum (Al), gallium (Ga), indium (In), or thallium (Ti). It is preferable to use lithium (Li), sodium (Na), magnesium (Mg) or aluminum (Al) as the organometallic compound. $R^1$ is a cyclic hydrocarbyl group of 5 to 30 carbon atoms having at least 2 conjugated double bonds, the conjugated double bonds is preferably 2 to 4, more preferably 2 to 3, the carbon atoms in the cyclic hydrocarbyl group is preferably 5 to 13. In detail, examples of $R^1$ include cyclopentadienyl group, substituted cyclopentadienyl group, indenyl group, substituted indenyl group, azulene group, substituted azulene group, fluorenyl group, substituted fluorenyl group and so on. Also, $R^1$ can be partially substituted with 1 to 6 substituents, and the substituent can be selected from a group consisting of alkyl group of 1 to 20 carbon atoms, alkenyl group of 3 to 20 carbon atoms, cycloalkyl group of 3 to 20 carbon atoms, haloalkyl group of 1 to 20 carbon atoms, aryl group of 6 to 20 carbon atoms, arylalkyl group of 6 to 20 carbon atoms, arylsilyl group of 6 to 20 carbon atoms, alkylaryl group of 6 to 20 carbon atoms, alkoxy group of 1 to 20 carbon atoms, alkylsiloxy group of 1 to 20 carbon atoms, aryloxy group of 6 to 20 carbon atoms, halogen atom, amino group and mixture thereof. $R^2$ and $R^3$ each is independently hydrocarbonyl group of 1 to 24 carbon atoms, preferably 1 to 12 carbon atoms, in detail, alkyl group such as methyl, ethyl, propyl, isopropyl, butyl, t-butyl, isobutyl, pentyl, hexyl, octyl and so on, cycloalkyl group such as cyclopentyl, cyclohexyl, cycloheptyl and so on, aryl group such as phenyl and so on, and arylalkyl group such as benzyl and so on. Also, l is an integer of 1 or more and is the valence of $M^1$ or less, m and n each is independently an integer of 0 to 2, l+m+n is equal to the valance of $M^1$.

Non-limiting examples of the organometallic compound represented by Formula 1 include cyclopentadienyl lithium, methylcyclopentadienyl lithium, 1,2,3,4-tetramethylcyclopentadienyl lithium, ethylcyclopentadienyl lithium, propylcyclopentadienyl lithium, butylcyclopentadienyl lithium, isobutylcyclopentadienyl lithium, octadecylcyclopentadienyl lithium, cyclopentylcyclopentadienyl lithium, cyclohexylcyclopentadienyl lithium, 1,3-butylmethyl cyclopentadienyl lithium, indenyl lithium, 1-methylindenyl lithium, 2-methylindenyl lithium, 1-ethylindenyl lithium, 2-ethylindenyl lithium, 1-propylindenyl lithium, 2-propylindenyl lithium, 2-phenylindenyl lithium, 3-phenylindenyl lithium, fluorenyl lithium, cyclopentadienyl sodium, methylcyclopentadienyl sodium, 1,2,3,4-tetramethylcyclopentadienyl sodium, ethylcyclopentadienyl sodium, propylcyclopentadienyl sodium, butylcyclopentadienyl sodium, isobutylcyclopentadienyl sodium, octadecylcyclopentadienyl sodium, cyclopentylcyclopentadienyl sodium, cyclohexylcyclopentadienyl sodium, 1,3-butylmethyl cyclopentadienyl sodium, indenyl sodium, 1-methylindenyl sodium, 2-methylindenyl sodium, 1-ethylindenyl sodium, 2-ethylindenyl sodium, 1-propylindenyl sodium, 2-propylindenyl sodium, 2-phenylindenyl sodium, 3-phenylindenyl sodium, fluorenyl sodium, cyclopentadienyl magnesium methyl, cyclopentadienyl magnesium ethyl, cyclopentadienyl magnesium isobutyl, cyclopentadienyl magnesium propyl, cyclopentadienyl magnesium heptyl, cyclopentadienyl magnesium octyl, methylcyclopentadienyl magnesium methyl, methylcyclopentadienyl magnesium ethyl, methylcyclopentadienyl magnesium isobutyl, methylcyclopentadienyl magnesium propyl, methylcyclopentadienyl magnesium heptyl, methylcyclopentadienyl magnesium octyl, 1,2,3,4-tetramethylcyclopentadienyl magnesium methyl, 1,2,3,4-tetramethylcyclopentadienyl magnesium ethyl, 1,2,3,4-tetramethylcyclopentadienyl magnesium isobutyl, 1,2,3,4-tetramethylcyclopentadienyl magnesium propyl, 1,2,3,4-tetramethylcyclopentadienyl magnesium heptyl, 1,2,3,4-tetramethylcyclopentadienyl magnesium octyl, ethylcyclopentadienyl magnesium methyl, ethylcyclopentadienyl magnesium ethyl, ethylcyclopentadienyl magnesium isobutyl, ethylcyclopentadienyl magnesium propyl, ethylcyclopentadienyl magnesium heptyl, ethylcyclopentadienyl magnesium octyl, propylcyclopentadienyl magnesium methyl, propylcyclopentadienyl magnesium ethyl, propylcyclopentadienyl magnesium isobutyl, propylcyclopentadienyl magnesium propyl, propylcyclopentadienyl magnesium heptyl, propylcyclopentadienyl magnesium octyl, butylcyclopentadienyl magnesium methyl, butylcyclopentadienyl magnesium ethyl, butylcyclopentadienyl magnesium isobutyl, butylcyclopentadienyl magnesium propyl, butylcyclopentadienyl magnesium heptyl, butylcyclopentadienyl magnesium octyl, isobutylcyclopentadienyl magnesium methyl, isobutylcyclopentadienyl magnesium ethyl, isobutylcyclopentadienyl magnesium isobutyl, isobutylcyclopentadienyl magnesium propyl, isobutylcyclopentadienyl magnesium heptyl, isobutylcyclopentadienyl magnesium octyl, octadecylcyclopentadienyl magnesium methyl, octadecylcyclopentadienyl magnesium ethyl, octadecylcyclopentadienyl magnesium isobutyl, octadecylcyclopentadienyl magnesium propyl, octadecylcyclopentadienyl magnesium heptyl, octadecylcyclopentadienyl magnesium octyl, cyclopentylcyclopentadienyl magnesium methyl, cyclopentylcyclopentadienyl magnesium ethyl, cyclopentylcyclopentadienyl magnesium isobutyl, cyclopentylcyclopentadienyl magnesium propyl, cyclopentylcyclopentadienyl magnesium heptyl, cyclopentylcyclopentadienyl magnesium octyl, cyclohexylcyclopentadienyl magnesium methyl, cyclohexylcyclopentadienyl magnesium ethyl, cyclohexylcyclopentadienyl magnesium isobutyl, cyclohexylcyclopentadienyl magnesium propyl, cyclohexylcyclopentadienyl magnesium heptyl, cyclohexylcyclopentadienyl magnesium octyl, 1,3-butylmethyl cyclopentadienyl magnesium methyl, 1,3-butylmethyl cyclopentadienyl magnesium ethyl, 1,3-butylmethyl cyclopentadienyl magnesium isobutyl, 1,3-butylmethyl cyclopentadienyl magnesium propyl, 1,3-butylmethyl cyclopentadienyl magnesium heptyl, 1,3-butylmethyl cyclopentadienyl magnesium octyl, bis(cyclopentadienyl)magnesium, bis (alkyl-cyclopentadienyl)magnesium, bis(indenyl)magnesium, bis(alkylindenyl)magnesium, indenyl magnesium methyl, indenyl magnesium ethyl, indenyl magnesium isobutyl, indenyl magnesium propyl, indenyl magnesium heptyl, indenyl magnesium octyl, 2-methylindenyl magnesium methyl, 2-methylindenyl magnesium ethyl, 2-methylindenyl magnesium isobutyl, 2-methylindenyl magnesium propyl, 2-methylindenyl magnesium heptyl, 2-methylindenyl magnesium octyl, 3-methylindenyl magnesium methyl, 3-methylindenyl magnesium ethyl, 3-methylindenyl magnesium isobutyl, 3-methylindenyl magnesium propyl, 3-methylindenyl magnesium heptyl, 3-methylindenyl magnesium octyl, 2-phenylindenyl magnesium methyl, 2-phenylindenyl magnesium ethyl, 2-phenylindenyl magnesium isobutyl, 2-phenylindenyl magnesium propyl, 2-phenylindenyl magnesium heptyl, 2-phenylindenyl magnesium octyl, 3-phenylindenyl magnesium methyl, 3-phenylindenyl magnesium ethyl, 3-phenylindenyl magnesium isobutyl, 3-phenylindenyl magnesium propyl, 3-phenylindenyl magnesium heptyl, 3-phenylindenyl magnesium octyl, fluorenyl magnesium methyl, fluorenyl magnesium ethyl, fluorenyl magnesium isobutyl, fluorenyl magnesium propyl, fluorenyl magnesium heptyl, fluorenyl magnesium octyl, cyclopentadienyl aluminum dimethyl, cyclopentadienyl aluminum diethyl, cyclopentadienyl aluminum diisobutyl, cyclopentadienyl aluminum dipropyl, cyclopentadienyl aluminum diheptyl, cyclopentadienyl aluminum dioctyl, methylcyclopentadienyl aluminum dimethyl, methylcyclopentadienyl aluminum diethyl, methylcyclopentadienyl aluminum diisobutyl, methylcyclopentadienyl aluminum dipropyl, methylcyclopentadienyl aluminum diheptyl, methylcyclopentadienyl aluminum dioctyl, 1,2,3,4-tetramethylcyclopentadienyl aluminum dimethyl, 1,2,3,4-tetramethylcyclopentadienyl aluminum diethyl, 1,2,3,4-tetramethylcyclopentadienyl aluminum diisobutyl, 1,2,3,4-tetramethylcyclopentadienyl aluminum dipropyl, 1,2,3,4-tetramethylcyclopentadienyl aluminum diheptyl, 1,2,3,4-tetramethylcyclopentadienyl aluminum dioctyl, ethylcyclopentadienyl aluminum dimethyl, ethylcyclopentadienyl aluminum diethyl, ethylcyclopentadienyl aluminum diisobutyl, ethylcyclopentadienyl aluminum dipropyl, ethylcyclopentadienyl aluminum diheptyl, ethylcyclopentadienyl aluminum dioctyl, propylcyclopentadienyl aluminum dimethyl, propylcyclopentadienyl aluminum diethyl, propylcyclopentadienyl aluminum diisobutyl, propylcyclopentadienyl aluminum dipropyl, propylcyclopentadienyl aluminum diheptyl, propylcyclopentadienyl aluminum dioctyl, butylcyclopentadienyl aluminum dimethyl, butylcyclopentadienyl aluminum diethyl, butylcyclopentadienyl aluminum diisobutyl, butylcyclopentadienyl aluminum dipropyl, butylcyclopentadienyl aluminum diheptyl, butylcyclopentadienyl aluminum dioctyl, isobutylcyclopentadienyl aluminum dimethyl, isobutylcyclopentadienyl aluminum diethyl, isobutylcyclopentadienyl aluminum diisobutyl, isobutylcyclopentadienyl aluminum dipropyl, isobutylcyclopentadienyl aluminum diheptyl, isobutylcyclopentadienyl aluminum dioctyl, octadecylcyclopentadienyl aluminum dimethyl, octadecylcyclopentadienyl aluminum diethyl, octadecylcyclopentadienyl aluminum diisobutyl, octadecylcyclopentadienyl aluminum dipropyl, octadecylcyclopentadienyl aluminum diheptyl, octadecylcyclopentadienyl aluminum dioctyl, cyclopentylcyclopentadienyl aluminum dimethyl, cyclopentylcyclopentadienyl aluminum diethyl, cyclopentylcyclopentadienyl aluminum diisobutyl, cyclopentylcyclopentadienyl aluminum dipropyl, cyclopentylcyclopentadienyl aluminum diheptyl, cyclopentylcyclopentadienyl aluminum dioctyl, cyclohexylcyclopentadienyl aluminum dimethyl, cyclohexylcyclopentadienyl aluminum diethyl, cyclohexylcyclopentadienyl aluminum diisobutyl, cyclohexylcyclopentadienyl aluminum dipropyl, cyclohexylcyclopentadienyl aluminum diheptyl, cyclohexylcyclopentadienyl aluminum dioctyl, 1,3-butylmethyl cyclopentadienyl aluminum dimethyl, 1,3-butylmethyl cyclopentadienyl aluminum diethyl, 1,3-butylmethyl cyclopentadienyl aluminum diisobutyl, 1,3-butylmethyl cyclopentadienyl aluminum dipropyl, 1,3-butylmethyl cyclopentadienyl aluminum diheptyl, 1,3-butylmethyl cyclopentadienyl aluminum dioctyl, indenyl aluminum dimethyl, indenyl aluminum diethyl, indenyl aluminum diisobutyl, indenyl aluminum dipropyl, indenyl aluminum diheptyl, indenyl aluminum dioctyl, 2-methylindenyl aluminum dimethyl, 2-methylindenyl aluminum diethyl, 2-methylindenyl aluminum diisobutyl, 2-methylindenyl aluminum dipropyl, 2-methylindenyl aluminum diheptyl, 2-methylindenyl aluminum dioctyl, 3-methylindenyl aluminum dimethyl, 3-methylindenyl aluminum diethyl, 3-methylindenyl aluminum diisobutyl, 3-methylindenyl aluminum dipropyl, 3-methylindenyl aluminum diheptyl, 3-methylindenyl aluminum dioctyl, 2-phenylindenyl aluminum dimethyl, 2-phenylindenyl aluminum diethyl, 2-phenylindenyl aluminum diisobutyl, 2-phenylindenyl aluminum dipropyl, 2-phenylindenyl aluminum diheptyl, 2-phenylindenyl aluminum dioctyl, 3-phenylindenyl aluminum dimethyl, 3-phenylindenyl aluminum diethyl, 3-phenylindenyl aluminum diisobutyl, 3-phenylindenyl aluminum dipropyl, 3-phenylindenyl aluminum diheptyl, 3-phenylindenyl aluminum dioctyl, fluorenyl aluminum dimethyl, fluorenyl aluminum diethyl, fluorenyl aluminum diisobutyl, fluorenyl aluminum dipropyl, fluorenyl aluminum diheptyl, fluorenyl aluminum dioctyl, bis(cyclopentadienyl)aluminum ethyl, bis(cyclopentadienyl)aluminum methyl, bis(methyl-cyclopentadienyl) aluminum ethyl, tris(cyclopentadienyl)aluminum, tris(methyl-cyclopentadienyl)aluminum, bis(indenyl)aluminum ethyl, bis(methyl-indenyl)aluminum ethyl, tris(indenyl)aluminum, tris(methyl-indenyl)aluminum, and so on, which can be used alone or as mixtures of two or more thereof.

Next, the first organic transition metal compound of Formula 2 will be explained in detail. $M^2$ in Formula 2 is titanium (Ti), zirconium (Zr) or hafnium (Hf), $R^4$ is defined as the same as $R^1$ of Formula 1 and X is a halogen atom. p is an integer of 0, 1 or 2, q is an integer of 2, 3 or 4, p+q is equal to the valance of M2. When the compound of Formula 2 in which p=2 and q=2 is used as the first organic transition metal compound, it is preferable to use the compound of Formula 2 in which p=0 and q=4, together.

Non-limiting examples of the first organic transition metal compound of Formula 2 include bis(cyclopentadienyl)zirconium difluoride, bis(methylcyclopentadienyl)zirconium difluoride, bis(n-propylcyclopentadienyl) zirconium difluoride, bis(n-butylcyclopentadienyl)zirconium difluoride, bis(cyclopentylcyclopentadienyl)zirconium difluoride, bis(cyclohexylcyclopentadienyl)zirconium difluoride, bis(1,3-dimethylcyclopentadienyl)zirconium difluoride, bis(isobutylcyclopentadienyl) zirconium difluoride, bis(indenyl)zirconium difluoride, bis(fluorenyl)zirconium difluoride, bis(4,5,6,7-tetrahydro-1-indenyl)zirconium difluoride, bis(cyclopentadienyl)zirconium difluoride, bis(m-ethylcyclopentadienyl)zirconium difluoride, bis(n-propylcyclopentadienyl)zirconium difluoride, bis(n-butylcyclopentadienyl) zirconium difluoride, bis(cyclopentylcyclopentadienyl) zirconium difluoride, bis(cyclohexylcyclopentadienyl)zirconium difluoride, bis(1,3-dimethylcyclopentadienyl)zirconium difluoride, bis(isobutylcyclopentadienyl) zirconium difluoride, bis(indenyl)zirconium dichloride, bis(fluorenyl)zirconium dichloride, bis(4,5,6,7-tetrahydro-1-indenyl)zirconium dichloride, bis(cyclopentadienyl)zirconium dichloride, bis(methylcyclopentadienyl)zirconium dichloride, bis(n-propylcyclopentadienyl)zirconium dichloride, bis(n-butylcyclopentadienyl) zirconium dichloride, bis(cyclopentylcyclopentadienyl) zirconium dichloride, bis(cyclohexylcyclopentadienyl)zirconium dichloride, bis(1,3-dimethylcyclopentadienyl)zirconium dichloride, bis(isobutylcyclopentadienyl) zirconium dichloride, bis(indenyl)zirconium dibromide, bis(fluorenyl)zirconium dibromide, bis(4,5,6,7-tetrahydro-1-indenyl)zirconium dibromide, bis(cyclopentadienyl)zirconium dibromide, bis(methylcyclopentadienyl)zirconium dibromide, bis(n-propylcyclopentadienyl)zirconium dibromide, bis(n-butylcyclopentadienyl) zirconium dibromide, bis(cyclopentylcyclopentadienyl) zirconium dibromide, bis(cyclohexylcyclopentadienyl)zirconium dibromide, bis(1,3-dimethylcyclopentadienyl)zirconium dibromide, bis(isobutylcyclopentadienyl)zirconium dibromide, cyclopentadienyl titanium trifluoride, cyclopentadienyl titanium trichloride, cyclopentadienyl titanium tribromide, cyclopentadienyl titanium triiodide, cyclopentadienyl zirconium trifluoride, cyclopentadienyl zirconium trichloride, cyclopentadienyl zirconium tribromide, cyclopentadienyl zirconium triiodide, cyclopentadienyl hafnium trifluoride, cyclopentadienyl hafnium trichloride, cyclopentadienyl hafnium tribromide, cyclopentadienyl hafnium triiodide, methylcyclopentadienyl titanium trifluoride, methylcyclopentadienyl titanium trichloride, methylcyclopentadienyl titanium tribromide, methylcyclopentadienyl titanium triiodide, methylcyclopentadienyl zirconium trifluoride, methylcyclopentadienyl zirconium trichloride, methylcyclopentadienyl zirconium tribromide, methylcyclopentadienyl zirconium triiodide, methylcyclopentadienyl hafnium trifluoride, methylcyclopentadienyl hafnium trichloride, methylcyclopentadienyl hafnium tribromide, methylcyclopentadienyl hafnium triiodide, butylcyclopentadienyl titanium trifluoride, butylcyclopentadienyl titanium trichloride, butylcyclopentadienyl titanium tribromide, butylcyclopentadienyl titanium triiodide, butylcyclopentadienyl zirconium trifluoride, butylcyclopentadienyl zirconium trichloride, butylcyclopentadienyl zirconium tribromide, butylcyclopentadienyl zirconium triiodide, butylcyclopentadienyl hafnium trifluoride, butylcyclopentadienyl hafnium trichloride, butylcyclopentadienyl hafnium tribromide, butylcyclopentadienyl hafnium triiodide, pentamethylcyclopentadienyl titanium trifluoride, pentamethylcyclopentadienyl titanium trichloride, pentamethylcyclopentadienyl titanium tribromide, pentamethylcyclopentadienyl titanium triiodide, pentamethylcyclopentadienyl zirconium trifluoride, pentamethylcyclopentadienyl zirconium trichloride, pentamethylcyclopentadienyl zirconium tribromide, pentamethylcyclopentadienyl zirconium triiodide, pentamethylcyclopentadienyl hafnium trifluoride, pentamethylcyclopentadienyl hafnium trichloride, pentamethylcyclopentadienyl hafnium tribromide, pentamethylcyclopentadienyl hafnium triiodide, indenyl titanium trifluoride, indenyl titanium trichloride, indenyl titanium tribromide, indenyl titanium triiodide, indenyl zirconium trifluoride, indenyl zirconium trichloride, indenyl zirconium tribromide, indenyl zirconium triiodide, indenyl hafnium trifluoride, indenyl hafnium trichloride, indenyl hafnium tribromide, indenyl hafnium triiodide, 4,5,6,7-tetrahydroindenyl titanium trifluoride, 4,5,6,7-tetrahydroindenyl titanium trichloride, 4,5,6,7-tetrahydroindenyl titanium tribromide, 4,5,6,7-tetrahydroindenyl titanium triiodide, 4,5,6,7-tetrahydroindenyl zirconium trifluoride, 4,5,6,7-tetrahydroindenyl zirconium trichloride, 4,5,6,7-tetrahydroindenyl zirconium tribromide, 4,5,6,7-tetrahydroindenyl zirconium triiodide, 4,5,6,7-tetrahydroindenyl hafnium trifluoride, 4,5,6,7-tetrahydroindenyl hafnium trichloride, 4,5,6,7-tetrahydroindenyl hafnium tribromide, 4,5,6,7-tetrahydroindenyl hafnium triiodide, methylindenyl titanium trifluoride, methylindenyl titanium trichloride, methylindenyl titanium tribromide, methylindenyl titanium triiodide, methylindenyl zirconium trifluoride, methylindenyl zirconium trichloride, methylindenyl zirconium tribromide, methylindenyl zirconium triiodide, methylindenyl hafnium trifluoride, methylindenyl hafnium trichloride, methylindenyl hafnium tribromide, methylindenyl hafnium triiodide, penylindenyl titanium trifluoride, penylindenyl titanium trichloride, penylindenyl titanium tribromide, penylindenyl titanium triiodide, penylindenyl zirconium trifluoride, penylindenyl zirconium trichloride, penylindenyl zirconium tribromide, penylindenyl zirconium triiodide, penylindenyl hafnium trifluoride, penylindenyl hafnium trichloride, penylindenyl hafnium tribromide, penylindenyl hafnium triiodide, fluorenylindenyl titanium trifluoride, fluorenylindenyl titanium trichloride, fluorenylindenyl titanium tribromide, fluorenylindenyl titanium triiodide, fluorenylindenyl zirconium trifluoride, fluorenylindenyl zirconium trichloride, fluorenylindenyl zirconium tribromide, fluorenylindenyl zirconium triiodide, fluorenylindenyl hafnium trifluoride, fluorenylindenyl hafnium trichloride, fluorenylindenyl hafnium tribromide, fluorenylindenyl hafnium triiodide and so on. Specifically, examples of the first organic transition metal compound represented by Formula 2 in which p=1 and q=4 include titanium fluoride, titanium chloride, titanium bromide, titanium iodide, zirconium fluoride, zirconium chloride, zirconium bromide, zirconium iodide, hafnium fluoride, hafnium chloride, hafnium bromide, hafnium iodide and so on, which can be used alone or as mixtures of two or more thereof.

Next, the second organic transition metal compound of Formula 3 will be explained in detail. $M^2$ in Formula 3 is defined as the same as $M^2$ in Formula 2, $R^5$ and $R^6$ are defined as the same as $R^1$ in Formula 1 and X is a halogen atom. Q is a divalent group selected from $(CR^7_2)_b$, $(SiR^7_2)_b$, $(GeR^7_2)_b$, $NR^7$ or $PR^7$ which connects $R^5$ and $R^6$, wherein substituents $R^7$ are independently a hydrogen atom, hydrocarbonyl group of 1 to 20 carbon atoms, b is an integer of 1 to 4, when Q is $(CR^7_2)_b$, $(SiR^7_2)_b$, $(GeR^7_2)_b$, two substituents $R^7$ connected to carbon (C), silicon (Si), germanium (Gee) can be connected to each other to form a ring of 2 to 7 carbon atoms.

The second organic transition metal compound is a catalyst component which can produce relatively medium molecular weight (for example, weight-average molecular weight of 50,000 to 200,000) polymer and high molecular weight (for example, weight-average molecular weight of 300,000 to 650,000) polymer. The second organic transition metal compound can stably produce relatively high molecular weight polymer at high temperature (about 80° C. or more), and may increase the amount of comonomer in polymer compared with the catalyst components (the organometallic compound and the first organic transition metal compound) which produces the low molecular weight polymer. The second organic transition metal compounds (metallocene) may include rigidly-bridged ansa-metallocenes in which one or two aryl groups, specifically one or two phenyl groups are bonded to a bridging atom linking ligands, but not limited by the above.

Non-limiting examples of the second organic transition metal compound of Formula 3 include rac-ethylenebis(1-indenyl)zirconium dichloride, rac-ethylenebis(1-indenyl) hafnium dichloride, rac-ethylenebis(1-tetrahydro-indenyl) zirconium dichloride, rac-ethylenebis(1-tetrahydro-indenyl)

hafnium dichloride, rac-dimethylsilanediylbis(2-methyl-tetrahydrobenzoindenyl)zirconium dichloride, rac-dimethylsilanediylbis(2-methyl-tetrahydrobenzoindenyl)hafnium dichloride, rac-diphenylsilanediylbis(2-methyl-tetrahydrobenzoindenyl)zirconium dichloride, rac-diphenylsilanediylbis(2-methyl-tetrahydrobenzoindenyl)hafnium dichloride, rac-dimethylsilanediylbis(2-methyl-4,5-benzoindenyl)zirconium dichloride, rac-dimethylsilanediylbis(2-methyl-4,5-benzoindenyl)hafnium dichloride, rac-diphenylsilanediylbis(2-methyl-4,5-benzoindenyl)zirconium dichloride, rac-diphenylsilanediylbis(2-methyl-4,5-benzoindenyl)hafnium dichloride, rac-dimethylsilanediylbis(2-methyl-5,6-cyclopentadienyl indenyl) zirconium dichloride, rac-dimethylsilanediylbis(2-methyl-5,6-cyclopentadienyl indenyl)hafnium dichloride, rac-diphenylsilanediylbis(2-methyl-5,6-cyclopentadienyl indenyl)zirconium dichloride, rac-diphenylsilanediylbis(2-methyl-5,6-cyclopentadienyl indenyl)hafnium dichloride, rac-dimethylsilylbis(2-methyl-4-phenylindenyl) zirconium dichloride, rac-dimethylsilylbis(2-methyl-4-phenylindenyl) hafnium dichloride, rac-diphenylsilylbis(2-methyl-4-phenylindenyl)zirconium dichloride, rac-diphenylsilylbis(2-methyl-4-phenylindenyl)hafnium dichloride, iso-propylidene(cyclopentadienyl) (9-fluorenyl) zirconium dichloride, iso-propylidene(cyclopentadienyl) (9-fluorenyl)hafnium dichloride, diphenylmethylidene(cyclopentadienyl) (9-fluorenyl)zirconium dichloride, diphenylmethylidene(cyclopentadienyl) (9-fluorenyl)hafnium dichloride, iso-propylidene(3-methycyclopentadienyl) (9-fluorenyl)zirconium dichloride, iso-propylidene(3-methycyclopentadienyl) (9-fluorenyl)hafnium dichloride, diphenylmethylidene(3-methylcyclopentadienyl) (9-fluorenyl)zirconium dichloride, diphenylmethylidene(3-methylcyclopentadienyl) (9-fluorenyl)hafnium dichloride, diphenylsilyl(cyclopentadienyl)(9-fluorenyl)zirconium dichloride, diphenylsilyl(cyclopentadienyl)(9-fluorenyl)zirconium)dichloride, diphenylmethylidene(cyclopentadienyl) (2,7-di-tert-butylfluoren-9-yl)zirconium dichloride, diphenylmethylidene(cyclopentadienyl) (2,7-di-tert-butylfluoren-9-yl) hafnium dichloride, diphenylmethylidene(3-tert-butyl-cyclopentadienyl) (2,7-di-tert-butylfluoren-9-yl)zirconium dichloride, diphenylmethylidene(3-tert-butylcyclopentadienyl) (2,7-di-tert-butylfluoren-9-yl)hafnium dichloride, diphenylmethylidene(3-tert-butyl-5-methylcyclopentadienyl) (2,7-di-tert-butylfluoren-9-yl)zirconium dichloride, diphenylmethylidene(3-tert-butyl-5-methylcyclopentadienyl) (2,7-di-tert-butylfluoren-9-yl)hafnium dichloride, 1,2-ethylenbis(9-fluorenyl)zirconium dichloride, 1,2-ethylenbis(9-fluorenyl)hafnium dichloride, rac-[1,2-bis(9-fluorenyl)-1-phenyl-ethane]zirconium dichloride, rac-[1,2-bis(9-fluorenyl)-1-phenyl-ethane]hafnium dichloride, [1-(9-fluorenyl)-2-(5,6-cyclopenta-2-methyl-1-indenyl)-ethane] zirconium dichloride, [1-(9-fluorenyl)-2-(5,6-cyclopenta-2-methyl-1-indenyl)-ethane]hafnium dichloride, [4-(fluorenyl)-4,6,6-tremethyl-2-phenyl-tetrahydropenterin] zirconium dichloride, [4-(fluorenyl)-4,6,6-tremethyl-2-phenyl-tetrahydropenterin]hafnium dichloride, iso-propylidene(2-phenyl-cyclopentadienyl)(9-fluorenyl) zirconium dichloride, iso-propylidene(2-phenyl-cyclopentadienyl)(9-fluorenyl)hafnium dichloride, diphenylmethylidene (2-phenyl-cyclopentadienyl)(9-fluorenyl)zirconium dichloride, diphenylmethylidene (2-phenyl-cyclopentadienyl)(9-fluorenyl)hafnium dichloride, iso-propylidene(2-phenyl-cyclopentadienyl)(2,7-di-tert-butylfluoren-9-yl)zirconium dichloride, iso-propylidene(2-phenyl-cyclopentadienyl) (2,7-di-tert-butylfluoren-9-yl) hafnium dichloride, diphenylmethylidene (2-phenyl-cyclopentadienyl) (2,7-di-tert-butylfluoren-9-yl)zirconium dichloride, diphenylmethylidene (2-phenyl-cyclopentadienyl)(2,7-di-tert-butylfluoren-9-yl)hafnium dichloride, [4-(fluorenyl)-4,6,6-trimethyl-2-(p-tolyl)-tetrahydropentalene] zirconium dichloride, [4-(fluorenyl)-4,6,6-trimethyl-2-(p-tolyl)-tetrahydropentalene]hafnium dichloride, [isopropylidene-(2-(p-tolyl)-cyclopentadienyl)-(9-fluorenyl)]zirconium dichloride, [isopropylidene-(2-(p-tolyl)-cyclopentadienyl)-(9-fluorenyl)]hafnium dichloride, [4-(fluroenyl)-4,6,6-trimethyl-2-(m-tolyl)-tetrahydropentalene]zirconium dichloride, [4-(fluroenyl)-4,6,6-trimethyl-2-(m-tolyl)-tetrahydropentalene]hafnium dichloride, [isopropylene(2-(m-tolyl)-cyclopentadienyl)-(9-fluorenyl)]zirconium dichloride, [isopropylene(2-(m-tolyl)-cyclopentadienyl)-(9-fluorenyl)]hafnium dichloride, [diphenylmethylidene(2-(m-molyl)-cyclopentadienyl)-(9-fluorenyl)]zirconium dichloride, [diphenylmethylidene(2-(m-molyl)-cyclopentadienyl)-(9-fluorenyl)]hafnium dichloride, [isopropylidene(2-(m-molyl)-cyclopentadienyl)(2,7-di-tert-butylfluorene9-yl)]zirconium dichloride, [isopropylidene(2-(m-tolyl)-cyclopentadienyl) (2,7-di-tert-butylfluorene9-yl)]hafnium dichloride, [diphenylidene(2-(m-tolyl)-cyclopentadienyl) (2,7-di-tert-butylfluorene-9-yl)] zirconium dichloride, [diphenylidene(2-(m-tolyl)-cyclopentadienyl) (2,7-di-tert-butylfluorene-9-yl)]hafnium dichloride, [4-(fluorenyl)-4,6,6-trimethyl-2-(o-tolyl)-tetrahydropentarene]zirconium dichloride, [4-(fluorenyl)-4,6,6-trimethyl-2-(o-tolyl)-tetrahydropentarene]hafnium dichloride [isopropylidene(2-(o-tolyl)-cyclopentadienyl)(9-fluorenyl)]zirconium dichloride, [isopropylidene(2-(o-tolyl)-cyclopentadienyl)(9-fluorenyl)]hafnium dichloride, [4-(fluorenyl)-4,6,6-trimethyl-2-(2,3-dimethyl)-tetrahydropentarene]zirconium dichloride, [4-(fluorenyl)-4,6,6-trimethyl-2-(2,3-dimethyl)-tetrahydropentarene]hafnium dichloride, [4-(fluorenyl)-4,6,6-trimethyl-2-(2,4-diphenyl)-tetrahydropentarene]zirconium dichloride, [isopropylidene (2-(2,3-dimethylphenyl)-cyclopentadienyl)(9-fluorenyl)] zirconium dichloride, isopropylidene(2-(2,3-dimethylphenyl)-cyclopentadienyl)(9-fluorenyl)]hafnium dichloride, isopropylidene (2-(2,4-dimethylphenyl)-cyclopentadienyl)(9-fluorenyl)] zirconium dichloride, [isopropylidene(2-(2,4-dimethylphenyl)-cyclopentadienyl)(9-fluorenyl)]hafnium dichloride, [diphenylmethylidene(2-(2,3-dimethylphenyl)-cyclopentadienyl)(9-fluorenyl)]zirconium dichloride, [diphenylmethylidene(2-(2,3-dimethylphenyl)-cyclopentadienyl)(9-fluorenyl)]hafnium dichloride, [diphenylmethylidene(2-(2,4-dimethylphenyl)-cyclopentadienyl) (9-fluorenyl)]zirconium dichloride, [diphenylmethylidene (2-(2,4-dimethylphenyl)-cyclopentadienyl)(9-fluorenyl)] hafnium dichloride, [isopropylidene(2-(2,3-dimethylphenyl)-cyclopentadienyl)(2,7-di-tert-butylfluoren-9-yl)]zirconium dichloride, [isopropylidene(2-(2,3-dimethylphenyl)-cyclopentadienyl)(2,7-di-tert-butylfluoren-9-yl)]hafnium dichloride, [isopropylidene(2-(2,4-dimethylphenyl)-cyclopentadienyl)(2,7-di-tert-butylfluoren-9-yl]zirconium dichloride, [isopropylidene(2-(2,4-dimethylphenyl)-cyclopentadienyl)(2,7-di-tert-butylfluoren-9-yl)]hafnium dichloride, [diphenylmethylidene(2-(2,3-dimethylphenyl)-cyclopentadienyl)(2,7-di-tert-butylfluoren-9-yl)]zirconium dichloride, [diphenylmethylidene(2-(2,3-dimethylphenyl)-cyclopentadienyl)(2,7-di-tert-butylfluoren-9-yl)]hafnium dichloride, [diphenylmethylidene(2-(2,4-dimethylphenyl)-cyclopentadienyl)(2,7-di-tert-butylfluoren-9-yl)]zirconium dichloride, [diphenylmethylidene(2-(2,4-dimethylphenyl)-cyclopentadienyl)(2,7-di-tert-butylfluoren-9-yl)]hafnium dichloride, [4-(fluorenyl)-4,6,6-trimethyl-2-(2,6-dimethylphenyl)-tetrahydropentarene]zirconium dichloride, [4-(fluorenyl)-4,6,6- trimethyl-2-(2,6-dimethylphenyl)-tetrahydropentarene]hafnium dichloride, [4-(fluorenyl)-4,6,6-trimethyl-2-(3,5-dipmethylhenyl)-tetrahydropentarene]zirconium dichloride, [4-(fluorenyl)-4,6,6-trimethyl-2-(3,5-dimethylphenyl)-tetrahydropentarene]hafnium dichloride, [4-(fluorenyl)-4,6,6-trimethyl-2-tetramethylphenyl-tetrahydropentarene]zirconium dichloride, [4-(fluorenyl)-4,6,6-trimethyl-2-tetramethylphenyl-tetrahydropentarene]hafnium dichloride, [4-(fluorenyl)-4,6,6-trimethyl-2-(2,4-dimethoxyphenyl)-tetrahydropentarene]zirconium dichloride, [4-(fluorenyl)-4,6,6-trimethyl-2-(2,4-dimethoxyphenyl)-tetrahydropentarene]hafnium dichloride, [4-(fluorenyl)-4,6,6-trimethyl-2-(3,5-dimethoxyphenyl)-tetrahydropentarene]zirconium dichloride, [4-(fluorenyl)-4,6,6-trimethyl-2-(3,5-dimethoxyphenyl)-tetrahydropentarene]hafnium dichloride, [4-(fluorenyl)-4,6,6-trimethyl-2-(chlorophenyl)-tetrahydropentarene]zirconium dichloride, [4-(fluorenyl)-4,6,6-trimethyl-2-(chlorophenyl)-tetrahydropentarene]hafnium dichloride, [4-(fluorenyl)-4,6,6-trimethyl-2-(fluorophenyl)-tetrahydropentarene]zirconium dichloride, [4-(fluorenyl)-4,6,6-trimethyl-2-(fluorophenyl)-tetrahydropentarene]hafnium dichloride, [4-(fluorenyl)-4,6,6-trimethyl-2-(difluorophenyl)-tetrahydropentarene]zirconium dichloride, [4-(fluorenyl)-4,6,6-trimethyl-2-(difluorophenyl)-tetrahydropentarene]hafnium dichloride, [4-(fluorenyl)-4,6,6-trimethyl-2-(pentafluorophenyl)-tetrahydropentarene]zirconium dichloride, [4-(fluorenyl)-4,6,6-trimethyl-2-(pentafluorophenyl)-tetrahydropentarene]hafnium dichloride, [4-(fluorenyl)-4,6,6-trimethyl-2-(tert-butyl-phenyl)-tetrahydropentarene]zirconium dichloride, [4-(fluorenyl)-4,6,6-trimethyl-2-(tert-butyl-phenyl)-tetrahydropentarene]hafnium dichloride, [4-(fluorenyl)-4,6,6-trimethyl-2-(3,5-trifluoromethyl-phenyl)-tetrahydropentarene]zirconium dichloride, 4-(fluorenyl)-4,6,6-trimethyl-2-(3,5-trifluoromethyl-phenyl)-tetrahydropentarene]hafnium dichloride, [4-(fluorenyl)-4,6,6-trimethyl-2-(3,5-di-tert-butylphenyl)-tetrahydropentarene]zirconium dichloride, 4-(fluorenyl)-4,6,6-trimethyl-2-(3,5-di-tert-butylphenyl)-tetrahydropentarene]hafnium dichloride, [4-(fluorenyl)-4,6,6-trimethyl-2-(biphenyl)-tetrahydropentarene]zirconium dichloride, 4-(fluorenyl)-4,6,6-trimethyl-2-(biphenyl)-tetrahydropentarene]hafnium dichloride, [4-(fluorenyl)-4,6,6-trimethyl-2-naphthyl-tetrahydropentarene]zirconium dichloride, 4-(fluorenyl)-4,6,6-trimethyl-2-naphthyl-tetrahydropentarene]hafnium dichloride, [4-(fluorenyl)-4,6,6-trimethyl-2-(3,5-diphenyl-phenyl)-tetrahydropentarene]zirconium dichloride, 4-(fluorenyl)-4,6,6-trimethyl-2-(3,5-diphenyl-phenyl)-tetrahydropentarene]hafnium dichloride, isopropylidene(2-tetramethylphenyl-cyclopentadienyl)(9-fluorenyl)zirconium dichloride, isopropylidene(2-(2,6-dimethylphenyl)-cyclopentadienyl)(9-fluorenyl)zirconium dichloride, isopropylidene(2-(3,5-dimethylphenyl)-cyclopentadienyl)(9-fluorenyl)zirconium dichloride, isopropylidene(2-(2,4-dimethoxyphenyl)-cyclopentadienyl) (9-fluorenyl)zirconium dichloride, isopropylidene(2-(3,5-dimethoxyphenyl)-cyclopentadienyl)(9-fluorenyl)zirconium dichloride, isopropylidene (2-(2,3-dimethoxyphenyl)-cyclopentadienyl)(9-fluorenyl)zirconium dichloride, isopropylidene (2-(2,6-dimethoxyphenyl)-cyclopentadienyl)(9-fluorenyl)zirconium dichloride, isopropylidene (2-(chlorophenyl)-cyclopentadienyl) (9-fluorenyl)zirconium dichloride, isopropylidene (2-(dichlorophenyl)-cyclopentadienyl)(9-fluorenyl)zirconium dichloride, isopropylidene (2-(trichlorophenyl)-cyclopentadienyl)(9-fluorenyl)zirconium dichloride, isopropylidene (2-(fluorophenyl)-cyclopentadienyl)(9-fluorenyl)zirconium dichloride, isopropylidene (2-(difluorophenyl)-cyclopentadienyl) (9-fluorenyl) zirconium dichloride, isopropylidene (2-(pentafluorophenyl)-cyclopentadienyl) (9-fluorenyl) zirconium dichloride, isopropylidene (2-(3,5-trifluoromethyl-phenyl)-cyclopentadienyl)(9-fluorenyl) zirconium dichloride, isopropylidene (2-(tert-butylphenyl)-cyclopentadienyl)(9-fluorenyl)zirconium dichloride, isopropylidene (2-(3,5-di-tert-butylphenyl)-cyclopentadienyl) (9-fluorenyl)zirconium dichloride, isopropylidene (2-(biphenyl)-cyclopentadienyl) (9-fluorenyl)zirconium dichloride, isopropylidene (2-(3,5-diphenyl-phenyl)-cyclopentadienyl)(9-fluorenyl)zirconium dichloride, isopropylidene (2-naphthyl-cyclopentadienyl)(9-fluorenyl)zirconium dichloride, diphenylmethylidene(2-tetramethylphenyl-cyclopentadienyl)(9-fluorenyl)zirconium dichloride, diphenylmethylidene(2-(2,6-dimethylphenyl)-cyclopentadienyl) (9-fluorenyl)zirconium dichloride, diphenylmethylidene (2-(3,5-dimethylphenyl)-cyclopentadienyl)(9-fluorenyl)zirconium dichloride, diphenylmethylidene(2-(2,4-dimethoxyphenyl)-cyclopentadienyl) (9-fluorenyl)zirconium dichloride, diphenylmethylidene(2-(3,5-dimethoxyphenyl)-cyclopentadienyl) (9-fluorenyl)zirconium dichloride, diphenylmethylidene (2-(2,3-dimethoxyphenyl)-cyclopentadienyl)(9-fluorenyl)zirconium dichloride, diphenylmethylidene (2-(2,6-dimethoxyphenyl)-cyclopentadienyl)(9-fluorenyl)zirconium dichloride, diphenylmethylidene (2-(chlorophenyl)-cyclopentadienyl) (9-fluorenyl) zirconium dichloride, diphenylmethylidene(2-(dichlorophenyl)-cyclopentadienyl) (9-fluorenyl)zirconium dichloride, diphenylmethylidene(2-(trichlorophenyl)-cyclopentadienyl) (9-fluorenyl)zirconium dichloride, diphenylmethylidene(2-(fluorophenyl)-cyclopentadienyl) (9-fluorenyl) zirconium dichloride, diphenylmethylidene(2-(difluorophenyl)-cyclopentadienyl) (9-fluorenyl)zirconium dichloride, diphenylmethylidene(2-(pentafluorophenyl)-cyclopentadienyl) (9-fluorenyl)zirconium dichloride, diphenylmethylidene(2-(3,5-trifluoromethyl-phenyl)-cyclopentadienyl) (9-fluorenyl)zirconium dichloride, diphenylmethylidene(2-(tert-butylphenyl)-cyclopentadienyl) (9-fluorenyl) zirconium dichloride, diphenylmethylidene(2-(3,5-di-tert-butylphenyl)-cyclopentadienyl) (9-fluorenyl)zirconium dichloride, diphenylmethylidene(2-(biphenyl)-cyclopentadienyl) (9-fluorenyl)zirconium dichloride, diphenylmethylidene(2-(3,5-diphenyl-phenyl)-cyclopentadienyl) (9-fluorenyl)zirconium dichloride, diphenylmethylidene(2-naphthyl-cyclopentadienyl) (9-fluorenyl) zirconium dichloride, isopropylidene (2-tetramethylphenyl-cyclopentadienyl)(2,7-di-tert-butylfluoren-9-yl)hafnium dichloride, isopropylidene(2-(2,6-dimethylphenyl)-cyclopentadienyl) (2,7-di-tert-butylfluoren-9-yl)hafnium dichloride, isopropylidene(2-(3,5-dimethylphenyl)-cyclopentadienyl) (2,7-di-tert-butylfluoren-9-yl)hafnium dichloride, isopropylidene(2-(2,4-dimethoxyphenyl)-cyclopentadienyl) (2,7-di-tert-butylfluoren-9-yl)hafnium dichloride, isopropylidene(2-(3,5-dimethoxyphenyl)-cyclopentadienyl) (2,7-di-tert-butylfluoren-9-yl)hafnium dichloride, isopropylidene(2-(2,3-dimethoxyphenyl)-cyclopentadienyl) (2,7-di-tert-butylfluoren-9-yl)hafnium dichloride, isopropylidene (2-(2,6-dimethoxyphenyl)-cyclopentadienyl) (2,7-di-tert-butylfluoren-9-yl)hafnium dichloride, isopropylidene(2-(chlorophenyl)-cyclopentadienyl) (2,7-di-tert-butylfluoren-9-yl)hafnium dichloride, isopropylidene(2-(dichlorophenyl)-cyclopentadienyl) (2,7-di-tert-butylfluoren-9-yl)hafnium dichloride, isopropylidene(2-(trichlorophenyl)-cyclopentadienyl) (2,7-di-tert-butylfluoren-9-yl) hafnium dichloride, isopropylidene(2-(fluorophenyl)-cyclopentadienyl) (2,7-di-tert-butylfluoren-9-yl)hafnium dichloride, isopropylidene(2-

(difluorophenyl)-cyclopentadienyl) (2,7-di-tert-butylfluoren-9-yl)hafnium dichloride, isopropylidene(2-(pentafluorophenyl)-cyclopentadienyl) (2,7-di-tert-butylfluoren-9-yl) hafnium dichloride, isopropylidene(2-(3,5-trifluoromethylphenyl)-cyclopentadienyl)(2,7-di-tert-butylfluoren-9-yl) hafnium dichloride, isopropylidene(2-(tert-butylphenyl)-cyclopentadienyl)(2,7-di-tert-butylfluoren-9-yl) hafnium dichloride, isopropylidene(2-(3,5-di-tert-butylphenyl)-cyclopentadienyl) (2,7-di-tert-butylfluoren-9-yl)hafnium dichloride, isopropylidene(2-(biphenyl)-cyclopentadienyl) (2,7-di-tert-butylfluoren-9-yl)hafnium dichloride, isopropylidene(2-(3,5-diphenyl-phenyl)-cyclopentadienyl) (2,7-di-tert-butylfluoren-9-yl)hafnium dichloride, isopropylidene(2-naphthyl-cyclopentadienyl) (2,7-di-tert-butylfluoren-9-yl) hafnium dichloride, diphenylmethylidene(2-tetramethylphenyl-cyclopentadienyl) (2,7-di-tert-butylfluoren-9-yl)hafnium dichloride, diphenylmethylidene (2-(2,6-dimethylphenyl)-cyclopentadienyl) (2,7-di-tert-butylfluoren-9-yl)hafnium dichloride, diphenylmethylidene (2-(3,5-dimethylphenyl)-cyclopentadienyl) (2,7-di-tert-butylfluoren-9-yl)hafnium dichloride, diphenylmethylidene (2-(2,4-dimethoxyphenyl)-cyclopentadienyl) (2,7-di-tert-butylfluoren-9-yl)hafnium dichloride, diphenylmethylidene (2-(3,5-dimethoxyphenyl)-cyclopentadienyl) (2,7-di-tert-butylfluoren-9-yl)hafnium dichloride, diphenylmethylidene (2-(2,3-dimethoxyphenyl)-cyclopentadienyl) (2,7-di-tert-butylfluoren-9-yl)hafnium dichloride, diphenylmethylidene (2-(2,6-dimethoxyphenyl)-cyclopentadienyl) (2,7-di-tert-butylfluoren-9-yl)hafnium dichloride, diphenylmethylidene (2-(chlorophenyl)-cyclopentadienyl) (2,7-di-tert-butylfluoren-9-yl)hafnium dichloride, diphenylmethylidene (2-(dichlorophenyl)-cyclopentadienyl) (2,7-di-tert-butylfluoren-9-yl)hafnium dichloride, diphenylmethylidene (2-(trichlorophenyl)-cyclopentadienyl)(2,7-di-tert-butylfluoren-9-yl)hafnium dichloride, diphenylmethylidene (2-(fluorophenyl)-cyclopentadienyl) (2,7-di-tert-butylfluoren-9-yl)hafnium dichloride, diphenylmethylidene (2-(difluorophenyl)-cyclopentadienyl) (2,7-di-tert-butylfluoren-9-yl)hafnium dichloride, diphenylmethylidene (2-(pentafluorophenyl)-cyclopentadienyl)(2,7-di-tert-butylfluoren-9-yl)hafnium dichloride, diphenylmethylidene (2-(3,5-trifluoromethyl-phenyl)-cyclopentadienyl) (2,7-di-tert-butylfluoren-9-yl)hafnium dichloride, diphenylmethylidene(2-(tert-butylphenyl)-cyclopentadienyl)(2,7-di-tert-butylfluoren-9-yl)hafnium dichloride, diphenylmethylidene(2-(3,5-di-tert-butylphenyl)-cyclopentadienyl) (2,7-di-tert-butylfluoren-9-yl)hafnium dichloride, diphenylmethylidene(2-(biphenyl)-cyclopentadienyl)(2,7-di-tert-butylfluoren-9-yl) hafnium dichloride, diphenylmethylidene(2-(3,5-diphenyl-phenyl)-cyclopentadienyl) (2,7-di-tert-butylfluoren-9-yl)hafnium dichloride, diphenylmethylidene(2-naphthyl-cyclopentadienyl) (2,7-di-tert-butylfluoren-9-yl) hafnium dichloride and so on, which can be used alone or as mixtures of two or more thereof.

The aluminoxane is for activating catalyst component and scavenging impurities, and, for example, an aluminoxane represented by the following Formula 4 can be used. The aluminoxane may have a linear, cyclic or network structure, and, for example, a linear aluminoxane can be represented by the following Formula 5, and a cyclic aluminoxane can be represented by the following Formula 6.

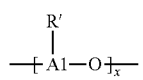

Formula 4

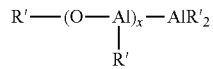

Formula 5

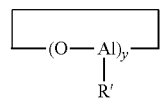

Formula 6

In Formulas 4, 5 and 6, R' is a hydrocarbyl radical of 1 to 10 carbon atoms, preferably a linear or a branched alkyl radical of 1 to 10 carbon atoms. More preferably, most of R' is methyl groups, x is an integer of 1 to 70, preferably 1 to 50, more preferably 10 to 40. y is an integer of 3 to 50, preferably 10 to 40.

In the present invention, as the aluminoxane, an alkyl aluminoxane which is commercially available can be used. The non-limiting examples of the alkyl aluminoxane include methylaluminoxane, ethylaluminoxane, butylaluminoxane, isobutylaluminoxane, hexylaluminoxane, octylaluminoxane, decylaluminoxane, and so on. The aluminoxane is commercially available in various forms of hydrocarbon solutions. Preferable aluminoxane is an aromatic hydrocarbon solution of aluminoxane, and more preferable aluminoxane is an aluminoxane dissolved in toluene. In the present invention, a single aluminoxane or mixtures of more than one aluminoxanes can be used. The alkyl aluminoxane can be prepared by various conventional methods such as adding proper amount of water to trialkylaluminum, or reacting a hydrocarbyl compound having water or an inorganic hydrated salt with trialkylaluminum. Conventionally, a mixture of linear aluminoxane and cyclic aluminoxane is obtained.

In the olefin polymerization catalyst composition according to the present invention, with respect to 1 mole of the first organic transition metal compounds of Formula 2, the amount of the organometallic compound represented by Formula 1 is 0.2 to 20 mole, preferably 0.5 to 10 mole, more preferably 1 to 7 mole. With respect to 1 mole of the first organic transition metal compounds of Formula 2, the amount of the second organic transition metal compounds of Formula 3 is 0.01 to 100 mole, preferably 0.1 to 21 mole, more preferably 1 to 10 mole. When the amount of the organometallic compound represented by Formula 1 is too little, the produced polyolefin may be mainly composed by polymer(polyolefin) components having high molecular weight, and when too much, the produced polyolefin may be mainly composed by polymer(polyolefin) components having low molecular weight. Also, in the first organic transition metal compounds represented by Formula 2, when both the compound of Formula 2 in which p=2 and q=2 and the compound of Formula 2 in which p=0 and q=4 are used, with respect to 1 mole of the compound of Formula 2 in which p=2 and q=2, the amount of the compound of Formula 2 in which p=0 and q=4, is 0.5 to 1.5 mole, preferably 0.8 to 1.2 mole. When the amount of the compound of Formula 2 in which p=0 and q=4, is out of the above-mentioned range, the polyolefin having a broad molecular weight distribution or multimodal molecular weight distribution, may not be prepared.

The amount of aluminum of the aluminoxane is 1 to 100,000 mole, preferably, 1 to 5,000 mole, more preferably 1 to 2,500 mole with respect to 1 mole of sum of the first organic transition metal compounds of Formula 2 and the second organic transition metal compounds of Formula 3.

For example, a mixture of the first organic transition metal compound, the organometallic compound represented by Formula 1 and the aluminoxane is prepared in which with respect to 1 mole of the first organic transition metal compound, the amount of aluminum is 1 to 100,000 mole, preferably 1 to 5,000 mole, and then another mixture including the aluminoxane is prepared in which with respect to 1 mole of the second organic transition metal compound, the amount of aluminum is 1 to 100,000 mole, preferably 1 to 5,000 mole. Then two mixtures are mixed to prepare the olefin polymerization catalyst composition according to the present invention.

The mixture of the catalyst component composition can be made without specific limitations. For example, the organometallic compound, the first and second organic transition metal compound and the aluminoxane can be mixed for 5 minutes to 24 hours, preferably 15 minutes to 16 hours simultaneously. Alternatively, the organometallic compound and the aluminoxane are mixed first for 5 minutes to 10 hours, preferably for 15 minutes to 4 hours, then, a mixture of the first organic transition metal compounds and the aluminoxane is added thereto and mixed for 5 minutes to 24 hours, preferably for 15 minutes to 16 hours, and finally another mixture of the second organic transition metal compounds and the aluminoxane is added thereto and again mixed for 5 minutes to 10 hours, preferably for 15 minutes to 4 hours. It is desirable that the compounds should be mixed under an inert atmosphere of nitrogen or argon, without a solvent, or in the presence of an inert hydrocarbon solvent such as heptane, hexane, benzene, toluene, xylene or mixtures thereof. The temperature of the mixing process is 0 to 150° C., preferably 10 to 100° C. The catalyst solution in which the catalyst is uniformly dissolved in the hydrocarbon solvent can be used as it stands, or the catalyst in a solid powder state after the solvent has been removed can be used. The catalyst in a solid powder state can be prepared by carrying out a precipitation reaction of the catalyst solution, and solidifying the precipitate from the reaction.

The olefin polymerization catalyst composition according to the present invention may further comprise an organic or inorganic carrier which supports mixture of the organometallic compound, the first and second organic transition metal compounds, and the aluminoxane. Therefore, the catalyst composition of the present invention can exist in a form supported by an organic or inorganic carrier or a form of an insoluble particle of the carrier, as well as a form of a solid powder or a homogeneous solution. The method for contacting the catalyst composition of the present invention with the carrier will be explained, but the present invention is not limited to the following methods. At first, a solution state catalyst is prepared by mixing the organometallic compound represented, the first and second organic transition metal compounds and the aluminoxane is contacted with a porous carrier (for example, a silica carrier having pore sizes of 50 to 500 Å and a pore volume of 0.1 to 5.0 cm$^3$/g) to form a slurry. Next, the catalyst of the slurry state is treated with an acoustic wave or oscillating wave having the frequency of 1 to 10.000 kHz, preferably 20 to 500 kHz at 0° C. to 120° C., preferably 0° C. to 80° C. for 0.1 to 6 hours, preferably 0.5 to 3 hour, to uniformly infiltrate the catalyst components into the pores of the carrier. And then, the catalyst slurry is dried under vacuum or nitrogen flow to form a catalyst of a solid powder state. The acoustic wave or oscillating wave is preferably ultrasonic waves. After applying the acoustic wave or the oscillating wave to the catalyst, the step of supporting the catalyst on a carrier may also include the step of washing the supported catalyst with a hydrocarbon selected from the group consisting of pentane, hexane, heptane, isoparaffin, toluene, xylene and mixtures thereof.

As the porous carrier, porous inorganic compounds, inorganic salts, and organic compounds with micro pores and a large surface area can be used without restrictions. The shape of the inorganic carrier is not limited if the shape can be maintained during the preparation process of the supported catalysts, and may be in any shape such as powder, particle, flake, foil, fiber, and so on. Regardless of the shape of the inorganic carrier, the maximum length of the inorganic carrier is generally from 5 to 200 μm, preferably from 10 to 100 μm, the preferable surface area of the inorganic carrier is 50 to 1,000 m$^2$/g and the preferable pore volume is 0.05 to 5 cm$^3$/g. Generally, the inorganic carrier should be treated to remove water or hydroxyl group therefrom before the use. The treatment can be carried out by calcining the carrier at 200° C. to 900° C. under an inert atmosphere such as air, nitrogen, argon, or so on. Non-limiting examples of the inorganic salt carrier or the inorganic carrier include silica, alumina, bauxite, zeolite, magnesium chloride ($MgCl_2$), calcium chloride ($CaCl_2$), magnesium oxide (MgO), zirconium dioxide ($ZrO_2$), titanium dioxide ($TiO_2$), boron trioxide ($B_2O_3$), calcium oxide (CaO), zinc oxide (ZnO), barium oxide (BaO), thorium oxide ($ThO_2$) and mixtures thereof such as silica-magnesium oxide ($SiO_2$—MgO), silica-alumina ($SiO_2$—$Al_2O_3$), silica-titanium dioxide ($SiO_2$—$TiO_2$), silica-vanadium pentoxide ($SiO_2$—$V_2O_5$), silica-chromium trioxide ($SiO_2$—$CrO_3$), silica-titanium dioxide-magnesium oxide ($SiO_2$—$TiO_2$—MgO) or so on. Small amount of carbonate, sulfate, or nitrate can be added to these compounds. Non-limiting examples of the organic carrier include starch, cyclodextrin, synthetic polymer or so on. Examples of the solvent, which is used for bringing the catalyst of the present invention into contact with the carrier, include an aliphatic hydrocarbon solvent such as pentane, hexane, heptane, octane, nonane, decane, undecane, dodecane and so on, an aromatic hydrocarbon solvent such as benzene, monochlorobenzene, dichlorobenzene, trichlorobenzene, toluene and so on, a halogenated aliphatic hydrocarbon solvent such as dichloromethane, trichloromethane, dichloroethane, trichloroethane, and so on. When the olefin polymerization catalyst composition according to the present invention is supported in the carrier, each components of the olefin polymerization catalyst composition is the same in the solution or solid state. The carrier amount of aluminum in the olefin polymerization catalyst composition is 5 to 30 weight part, preferably 7 to 20 weight part with respect to 100 weight part of the carrier, and the carrier amount of the transition metal compound in the olefin polymerization catalyst composition is 0.01 to 2 weight part, preferably 0.05 to 1.5 weight part with respect to 100 weight part of the carrier.

Next, the present olefin polymerization process will be described. The olefin polymerization catalyst composition of the present invention can exist in a form supported by an inorganic or organic carrier (silica, alumina, silica-alumina mixture, and so on) or a form of an insoluble particle of the carrier, as well as a form of a homogeneous solution. Thus, the olefin polymerization catalyst composition can be used for a solution phase, a slurry phase, a bulk phase or a gas phase polymerization reaction. The conditions for the polymerization reactions can be varied according to the state of the catalyst (homogeneous or heterogeneous phase (supported phase)), the polymerization method (solution polymerization, slurry polymerization, gas phase polymerization), target polymer properties or the polymer shape. When the polymerization is carried out in a solution phase or a slurry phase, a solvent or olefin itself may work as a reaction medium. Examples of the solvent include propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and so on, and, if necessary, mixtures of the solvents can be used. In the polymerization or copolymerization of olefin according to the present invention, the amount of the catalyst composition used is not limited especially. However, the concentration of the central metal of the first and second organic transition metal compounds is preferably $10^{-8}$ to $10^1$ mol/l, and more preferably $10^{-7}$ to $10^{-2}$ mol/l in a polymerization reaction system.

In the olefin polymerization or copolymerization of the present invention, the polymerization temperature is generally 70 to 110° C., which is not especially limited because it can be varied according to reactants, reaction conditions, and so on. However, the polymerization temperature is generally 0 to 250° C., and more preferably 10 to 200° C. in a solution polymerization, and generally 0 to 120° C., and more preferably 20 to 110° C. in a slurry or a gas phase polymerization. The polymerization pressure is generally atmospheric pressure to 500 kg/cm², preferably atmospheric pressure to 60 kg/cm², more preferably atmospheric pressure to 10 to 60 kg/cm². The polymerization reaction can be carried out in a batch type, a semi-continuous type, or a continuous type reaction. The polymerization can be carried out by two or more steps of different reaction conditions. The molecular weight and molecular weight distribution of the resulting polymer can be controlled by changing the polymerization temperature, or by injecting hydrogen into a reactor. The polyolefin resin polymerization of the present invention can be carried out by using a conventional single loop reactor, gas phase reactor, ICFB (internally circulating fluidized-bed) reactor (Referring to Korean Patent Nos. 10-981612, 10-999543 and 10-999551 etc.).

The olefin polymerization catalyst composition of the present invention can be used not only in a main polymerization of olefin monomers but also in a prepolymerization of olefin monomers. In the prepolymerization process, the olefin polymer or copolymer is produced in the amount of 0.05 to 500 g, preferably 0.1 to 300 g, and more preferably 0.2 to 100 g with respect to 1 g of the catalyst. Examples of the olefin suitable for the prepolymerization, include α-olefin of 2 to 20 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, and so on. And it is preferable that olefin for the prepolymerization is the same one for the main polymerization.

Hereinafter, the preferable examples are provided for better understanding of the present invention. However, the present invention is not limited to the following examples. In the following examples, the olefin polymerization catalyst was produced with Schlenk method in which air and moisture were completely blocked, and purified and dried nitrogen was used as an inert gas. Solvent was dried with sodium metal under inert nitrogen atmosphere. In the specification and the Examples, various properties were measured as follows.

(1) Density: Density was measured in accordance with ASTM 1505 and ASTM D 1928

(2) Melt flow index (MIE, 2.16 kg/10 minutes): MIE was measured in accordance with ASTM D1238 at 190° C.

(3) High load MIE (MIF, 21.6 kg/10 minutes): MIF was measured in accordance with ASTM D1238 at 190° C.

(4) Shear response (SR): MIF/MIE (5) Molecular weight and molecular weight distribution: They were measured by using GPC (Polymer Laboratory Inc. 220 system) as follows. As separation columns, two Olexis and one Guard were used, and the column temperature was maintained at 160° C. As a calibration, a standard polystyrene set by Polymer Laboratory Inc was used, and as an eluant, trichlorobenzen containing 0.0125 weight % of BHT (antioxidant) was used. Samples were prepared in a ratio of 0.1-1 mg/ml, injection amount was 0.2 mL, injection time was 30 minutes, pump flow rate was maintained at 1.0 ml/min, measurement time was for 30 to 60 minutes. After Universal calibration was made by using polystyrene standard materials of Easical A and Easical B (Produced by Agilent technologies), conversion to polyethylene was carried out to measure number-average molecular weight (Mn), weight-average molecular weight (Mw), and z average molecular weight (Mz). As a detector, a RI (Refractive Index) detector was used. The molecular weight distribution (Mw/Mn) represents the ratio of weight average molecular weight to number average molecular weight.

(6) Measurement of amount of ethylene and α-olefin: The number of methyl branch per 1000 carbon atoms in ethylene polymer chain was measured by 13C-NMR. In measuring with 13C-NMR, 500 nuclear magnetic resonance device (1H: 500) of Brucker Corporation (Germany) was used, the measurement was carried out 1000 to 3000 times in cumulative, and main chain methylene peak (29.97 ppm) was used as a standard of chemical shift. NMR measurement was applied to the solution which was prepared by adding 100 to 200 mg of sample and 2 ml of 1,1,2,2-tetrachloroethne into a commercially available NMR measuring quartz glass tube having diameter of 5 mm, and then heating and uniformly dispersing at 120° C.

(7) Cross-Fractionation Chromatography (CFC): CFC (PolymerChar product) measurement was carried out as follows. As the separation columns, two Olexis, one Guard were used, column temperature was maintained at 150° C. and as a calibration, a standard polystyrene set by Polymer Laboratory Inc was used. As an eluant, trichlorobenzen was used, concentration of samples was 70 to 80 mg/ml, injection amount was 0.5 ml and pump flow rate was maintained at 1.0 ml/min. After injecting samples, the oven temperature is raised in 40° C./minute, so the temperature of the sample was increased up to 150° C. After maintaining the temperature at 150° C. for 60 minutes, the oven was cooled in 40° C./minute, so the temperature of the sample was cooled to 95° C. After maintaining the temperature at 95° C. for 45 minutes, the oven was heated in 0.5° C./minute, the temperature of the sample was cooled to 30° C. and maintained for 30 minutes. Then, the temperature of the sample was raised from 35° C. to 120° C., wherein the temperature range was divided to 22 parts with 4° C. interval, 0.5 mL of sample was injected to each part of the temperature range so as for eluted fractions to pass TREF column and Olexis column, and then TREF value and molecular weight were measured. Then PE conversion molecular weight was calculated by using a calibration curve using a standard polystyrene set. Data processing was performed by using "CFC calibration", being parts analyzer program, and the time for the analyzer was about 600 minutes, and as a detector an infrared spectroscopy was used.

(8) Flow activation energy (Ea): Test sample of 24 mm diameter was prepared by punching a press sheet having 2 mm thickness by using a Wabash thermal hydraulic pressure set at 190° C., with a pressure of 100 kg/cm². Measurement was done as follows by using RMS 800 (produced by RHEOMETRICS). The measurement was made at 150° C., 170° C., and 190° C., in 10% strain, and in 0.1 rad/sec-100 rad/sec. Ea was measured by using a software of TAI-Orchestrator TTS curve shifting.

(9) Long Chain Branch (LCB): LCB was measured by using Ea and flowing Equation.

$$LCB=[Ea/4.186)-6.24/(7.93\times10^5)]\times(1.4\times10^4)$$

(10) Melt Tension: Melt Tension was measured as follows by using Capirograph 1B (produced by Toyoseiki Kogyo Co., Ltd.). Melt tension of 5 to 10 g of pellet sample was measure by using a capillary having a length of 10 mm and a diameter of 1.0 mm, at temperature of 230° C., in velocity of 10 mm/min, at draw of 30 m/min, and the measurement was performed three times about one sample and the average of measurements was determined.

(11) Tensile Strength at Yield: Tensile Strength at Yield was measured in accordance with ASTM D638. The test rate was 50 mm/min, the measurement was performed five times per one sample and the average of measurements was determined.

(12) Elongation: Elongation was measured in accordance with ASTM D638. The test rate was 50 mm/min, the measurement was performed five times per one sample and the average of measurements was determined.

(13) Flexural Modulus: Flexural Modulus was measured in accordance with ASTM D790. The measurement was made until 5% deformation, and was performed five times per one sample and the average of measurements was determined.

(14) Izod Impact: Izod Impact was measured in accordance with ASTM D256. The width and thickness of the test chip were measured so that Impact strength was measured, and measurement was performed at least five times per one sample and the average of measurements was determined.

(15) PENT: PENT was measured in accordance with ASTM D1473. The test chip was prepared from a press sheet having 6 mm thickness by using a thermal hydraulic pressure set at 190° C. (produced by Shindong Metal Industrial Co., Ltd.), with a pressure of 100 kg/cm$^3$. Notches were formed at three sides of the test chip (the notch in wide side has 2.5 mm depth, and the notch in shallow side has 1 mm depth). The test chips were placed in a 95-chamber in which the top part and the lower part of the test chip was fixed and a pressure of 3.7 MPa was applied to measure fail time of the test chip.

(16) Hydraulic pressure endurance test: Hydraulic pressure endurance test was performed in accordance with KS M ISO 1167. Pipe having 16 mm of outer diameter and 1.4 mm of thickness was placed in water at 95° C. Circumferential stress of 3.9 MPa, 3.7 MPa was applied to the inside of the pipe to measure fail time of the pipe.

(17) Pipe appearance: pipe appearance was measured through naked eye and determined as good, fair and poor.

(18) Moldability test of the product: Films (Width: 45 cm, Thickness: 25 μm) were extruded by using Shin Hwa HDPE Blown M/C extruder (Die Dia: 50Φ, Screw dia: 40Φ) at 200° C. (Die temperature and Adapter temperature). Pipes having 16 mm of outer diameter and 1.4 mm of thickness were extruded through a pipe extruder (produced by Wonil Engineering Co., Ltd., 16Φ Die Dia., 41Φ Screw Dia.) at 200° C. (Die temperature) (Line speed: 10 m/min).

(18a) Melting pressure of resin (bar): When extruding the films and the pipes at the above-mentioned condition, melting pressure generated at the extruding part was measured.

(18b) extrusion capacity (g/min): When extruding the films and the pipes at the above-mentioned condition, resin weight extruded per minute was measured.

Manufacturing Example 1: Preparation of Catalyst Composition

In a 150 ml flask of nitrogen atmosphere, bis(indenyl) aluminum ethyl((Ind)$_2$AlEt) (component 1) as the organometallic compound, bis(isobutylcyclopentadienyl)zirconium dichloride/zirconium chloride ((iBuCp)$_2$ZrCl$_2$/ZrCl$_4$) as the first organic transition metal compound (component 2), diphenylmethylidene (n-butylcyclopentadienyl)(2,7-di-tert-butylflupren-9-yl)zirconium dichloride (Ph$_2$C (2,7-t-BuFlu)) (nBu-Cp)ZrCl$_2$) as the second organic transition metal compound (component 3), and methyl aluminoxane (MAO, Albemarle company, 10% toluene solution) were mixed and stirred at 60° C. for 60 minutes to obtain a catalyst solution. Calcined silica (SiO$_2$) was added to the catalyst solution at 250° C. and ultrasound wave was applied for 1 hour and then supernatant was removed. Next, the solid particles remaining was washed twice with hexane, and dried in a vacuum to prepare to prepare a supported catalyst of free-flowing solid powder. The amount of aluminum in the supported catalyst was 12.5 weight % and the amount of zirconium in the supported catalyst was 0.2 weight %.

Examples 1 to 3: Copolymerization of Ethylene/1-Hexane and Test of Processability and Physical Properties of the Copolymer According to a single continuous loop method, the supported metallocene catalyst mixture obtained from the Manufacturing Example 1 was continuously injected to a single loop slurry polymerization process at a rate of 1.5 g/h, and 1-hexane was used as a comonomer, to prepare polyethylene. In detail, ethylene, 1-hexane and the catalyst were continuously injected to a 53 L-single loop reactor filled with isobutane, while satisfying the conditions mentioned in following Table 1, thereby continuously preparing the polyethylene. 1000 ppm of a first antioxidant (Ethanox 330, Albemarle Corporation), 3000 ppm of first and second antioxidant blend (S12B, Songwon Industrial Co., Ltd.) and 1500 ppm of processing aid agent (Zn—St, Songwon Industrial Co., Ltd.) were added to the obtained polyethylene, and the mixture was granulated by using a twin screw extruder (W&P Twin Screw Extruder, 75Φ, L/D=36) at 170-220° C. The physical properties ((Mw/1000 (weight average molecular weight/1000), Melt flow index (MIE, MIF), SR (MIF/MIE) and density) of polyethylene raw material and product from the same were evaluated according to the above-mentioned test methods, and the results thereof were shown in Table 1.

TABLE 1

|  | Example 1 | Example 2 | Example 3 |
|---|---|---|---|
| Polymerization temperature (° C.) | 88 | 86 | 84 |
| ethylene mol % | 13 | 13 | 13 |
| 1-hexane (wt %) | 4 | 4.4 | 4.8 |
| hydrogen (mg/kgC2) | 180 | 200 | 250 |
| Catalyst activation (gPE/gCat-hr) | 10,000 | 9,000 | 8,000 |
| Amount of 1-hexane | 0.96 | 1.26 | 2.77 |
| Mw/1000 | 181 | 164 | 154 |
| MWD | 13.7 | 16.2 | 20.9 |

TABLE 1-continued

| | Example 1 | Example 2 | Example 3 |
|---|---|---|---|
| Molecular weight distribution | bimodal | bimodal | bimodal |
| Amount of molecular weight of 10,000 or less, weight % | 18.75 | 24.81 | 28.44 |
| Amount of molecular weight of 1,000,000 or more, weight % | 2.50 | 2.17 | 1.97 |
| TREF elution fraction at 80° C. or less, weight % | 9.01 | 16.19 | 19.76 |
| MIE | 0.11 | 0.20 | 0.28 |
| MIF | 8.54 | 17.5 | 21.1 |
| SR (F/E) | 77.6 | 87.5 | 78.9 |
| Density | 0.9393 | 0.9415 | 0.9412 |

Comparative Examples 1 to 3: Test of Physical Properties of Commercially Available Copolymer The physical properties and moldability of three kinds of commercially available polyethylene products (Comparative Examples 1 to 3) were evaluated and compared with Example 2 in the same condition applied to the polyethylene of Example 2, and the results thereof were shown in Table 2, Table 3 and Table 4.

The physical properties, sheet properties and pipe moldability of products from the polymer in Example 2 and the commercially available polyethylene were shown in Table 2 and Table 3. For comparing long-term properties of the resin, PENT properties of sheets and hydraulic pressure endurances of pipes made with the polymer in Example 2 and the commercially available polyethylene were shown in Table 4.

TABLE 2

| | Item | Example 2 | Comparative Example 1 | Comparative Example 2 | Comparative Example 3 |
|---|---|---|---|---|---|
| Physical properties of resin | MIE, g/10 minutes | 0.2 | 0.6 | 0.82 | 0.14 |
| | SR (F/E) | 87.5 | 30 | 33 | 67 |
| | density, g/cm$^3$ | 0.9415 | 0.9345 | 0.941 | 0.9487 |
| | Molecular weight distribution | bimodal | monomodal | monomodal | monomodal |
| | MWD(Mw/Mn) | 16.19 | 5.40 | 4.74 | 27.39 |
| | Amount of molecular weight of 10,000 or less, weight % | 24.81 | 11.08 | 7.49 | 17.68 |
| | Amount of molecular weight of 1,000,000 or more, weight % | 2.17 | 0.28 | 0.79 | 7.49 |
| | TREF Elution fraction at 80° C. or less, weight % | 16.19 | 3.10 | 1.83 | 10.7 |
| Physical properties of sheet | Tensile strength at yield, kg/cm$^2$ | 212 | 180 | 210 | 222 |
| | elongation, % | 773 | 850 | 780 | 675 |
| | Flexural modulus, kg/cm$^2$ | 6690 | 5570 | 6390 | 7840 |
| | Izod Impact, (Notch, −20° C.), kgcm/cm | 9.7 | 8 | 6.2 | 6.9 |

TABLE 3

| | Item | Example 2 | Comparative Example 1 | Comparative Example 2 | Comparative Example 3 |
|---|---|---|---|---|---|
| Physical properties of resin | MIE | 0.2 | 0.58 | 0.82 | 0.12 |
| | SR (F/E) | 87.5 | 29.3 | 33.2 | 82.8 |
| | density, g/cm$^3$ | 0.9415 | 0.9345 | 0.941 | 0.9487 |
| Pipe Moldability (200° C.) | Resin melting pressure (Bar) | 96-97 | 124-126 | 97-101 | 120-122 |
| | ampere(A) | 63-65 | 65-66 | 64-67 | 79-81 |
| | Screw rotation number, rpm | 58.3 | 70.6 | 58.3 | 58.3 |
| | Motor rotation number, rpm | 880 | 1065 | 880 | 880 |
| | Extrusion capacity, g/minute | 694 | 565 | 682 | 688 |
| | Pipe surface | good | good | good | good |

TABLE 4

| | Item | Example 2 | Comparative Example 1 | Comparative Example 2 | Comparative Example 3 |
|---|---|---|---|---|---|
| Physical properties of resin | MIE, g/10 min. | 0.2 | 0.6 | 0.82 | 0.14 |
| | SR (MIF/MIE) | 87.5 | 30 | 33 | 67 |
| | density, g/cm$^3$ | 0.9415 | 0.9345 | 0.941 | 0.9487 |
| | Ea(kJ/mol) | 28.023 | 24.823 | 23.891 | 22.224 |
| | LCB | 0.008 | −0.005 | −0.009 | −0.016 |

TABLE 4-continued

| | Item | Example 2 | Comparative Example 1 | Comparative Example 2 | Comparative Example 3 |
|---|---|---|---|---|---|
| | Melt Tension gf (230° C.) | 4.74 | 4.64 | 1.32 | 3.81 |
| Sheet PENT (Hours) | 3.6 MPa at 95° C. | 1370< | 136 | 49 | About 1100 |
| | 3.7 MPa at 95° C. | 1370< | — | 72 | about 600 |
| Hydraulic Pressure Endurance Test | 3.9 MPa at 95° C. | 1500< | about 1500 | about 1060 | about 600– |
| | 3.7 MPa at 95° C. | 1300< | — | — | — |

From GPC (Gel Permeation Chromatography) tests shown in Tables 1 and 2, the polyethylene obtained in Examples 1 to 3 are all bimodal polyethylene while the polyethylene obtained in Comparative Examples 1 to 3 are all monomodal polyethylene. In physical properties of sheets, Izod impact strength of the polyethylene of the present invention is the best (Example 2 in Table 2). In pipe moldabilty, the polyethylene of the present invention, in comparison with the polyethylene of Comparative Example 1, has an extrusion amount higher by over 20%, in low screw rotation number and motor rotation number, so the moldability of the polyethylene of the present invention is excellent (Table 3). Further, when comparing the polyethylene of Example 2 and the polyethylene's of Comparative Examples 2 and 3, the polyethylene of Example 2 has the greater extrusion amount in same conditions of screw rotation number and motor rotation number, and has used lower resin melting pressure and ampere. Thus, by the present invention, it is possible to obtain satisfactory molding result with using a low energy. Besides such superior moldability, the polyethylene of the present invention showed superior or equivalent result in sheet properties and hydraulic pressure test in comparison with those of Comparative examples.

Also, in pipe hydraulic pressure endurance test, the polyethylene of Comparative Examples is equal to or inferior to that of Example 2. But, in sheet properties, the polyethylene of Comparative Examples are inferior to that of Example 2. These mean that the pipe manufactured with polyethylene of Comparative Examples may be broken in more short time than the pipe manufactured by polyethylene of the present invention, when the notches are formed during the transportation and the construction, after producing the pipes. Accordingly, it is desirable for polyethylene to endure 200 hours or more, preferably 600 hours, and most preferably 1000 hours in a hydraulic pressure endurance test (KS M ISO 1167) at 95° C. and 3.7 Mpa and in a sheet PENT test (ASTM D1473).

Accordingly, compared with the conventional polyethylene, the present polyethylene has good moldability and has equal or superior physical properties. With the present polyethylene, the amount of energy for processing the polyethylene can be reduced, and the productivity of the molded product is increased. More specifically, the present polyethylene has suitable physical properties as raw materials of pipes used in high temperature and high pressure heating. Compared with the conventional polyethylene for pipes, the present polyethylene has superior moldability due to its bimodal structure, despite its high molecular weight.

Figure 2:
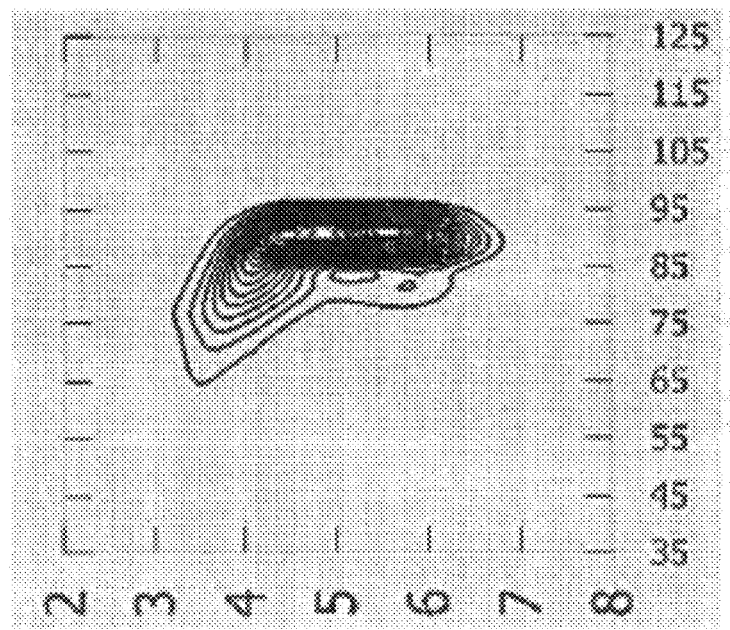
Figure 3:
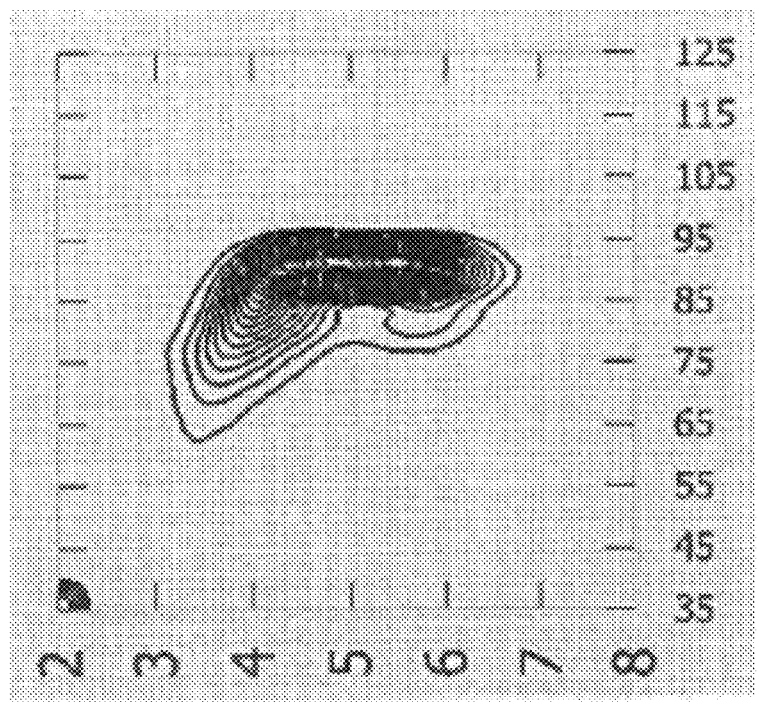
Figure 4:
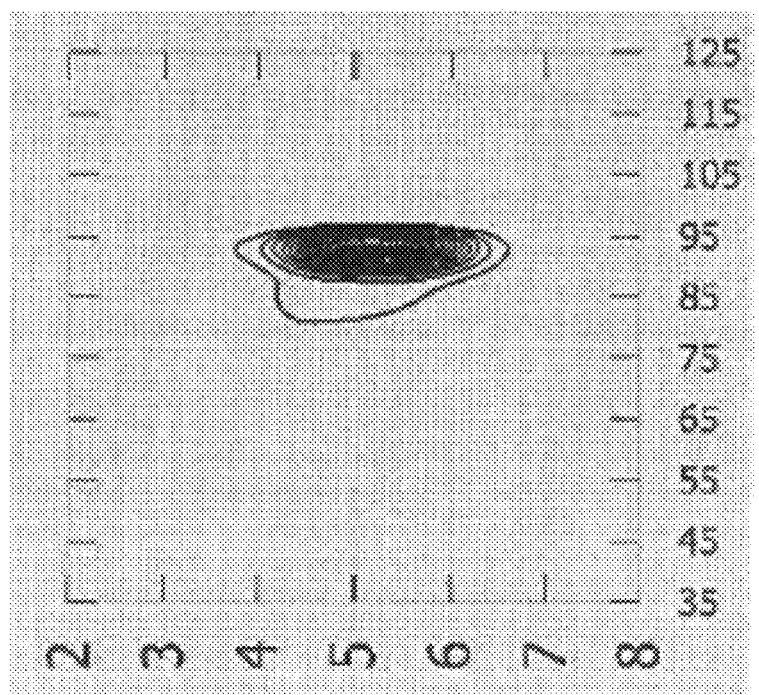
FIG. 4 to FIG. 6 show CFC (Cross-Fractionation Chromatography) data of polyethylene obtained at Comparative Example 1 to Comparative Example 3, respectively.
Figure 5:
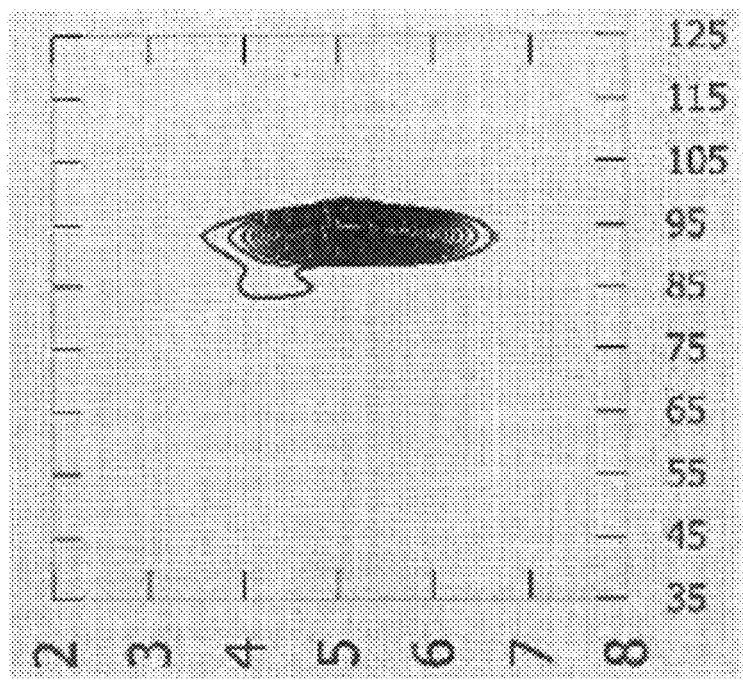
Figure 6:
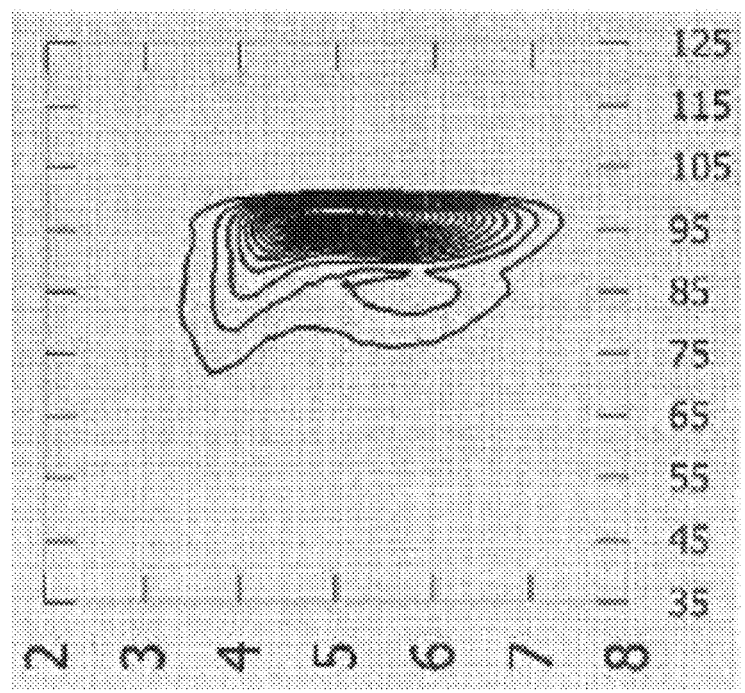
Figure 7:
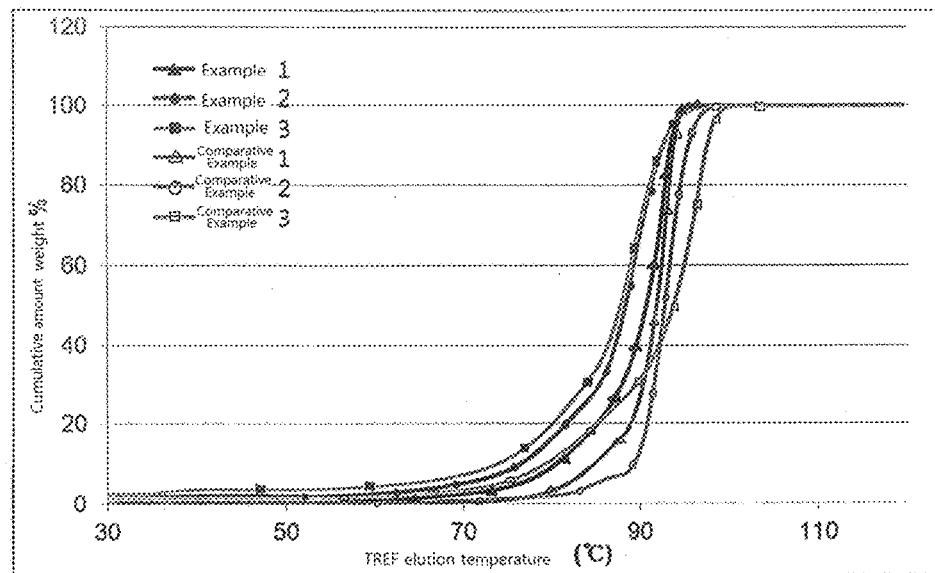
FIG. 7 shows graphs illustrating amount of cumulative elution (weight %) of samples according to the temperature, the samples being obtained by carrying out TREF (temperature rising elution fractionation) elution test on the polyethylene of the Examples and the Comparative Examples.
Figure 8:
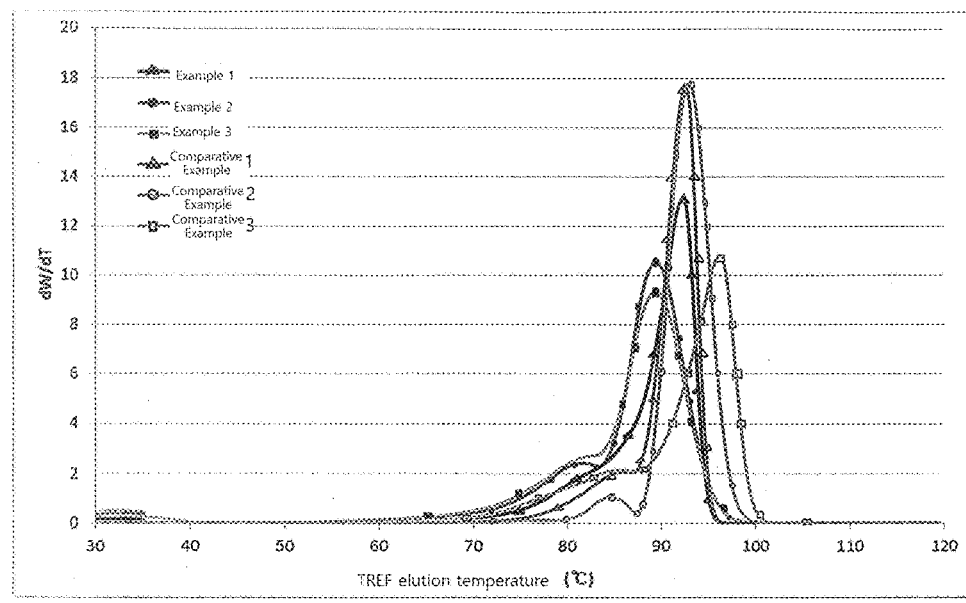
FIG. 8 shows graphs illustrating distribution of elution (weight %) amount of samples according to the temperature, the samples being obtained by carrying out TREF (temperature rising elution fractionation) elution test on the polyethylene of the Examples and the Comparative Examples.
Figure 9:
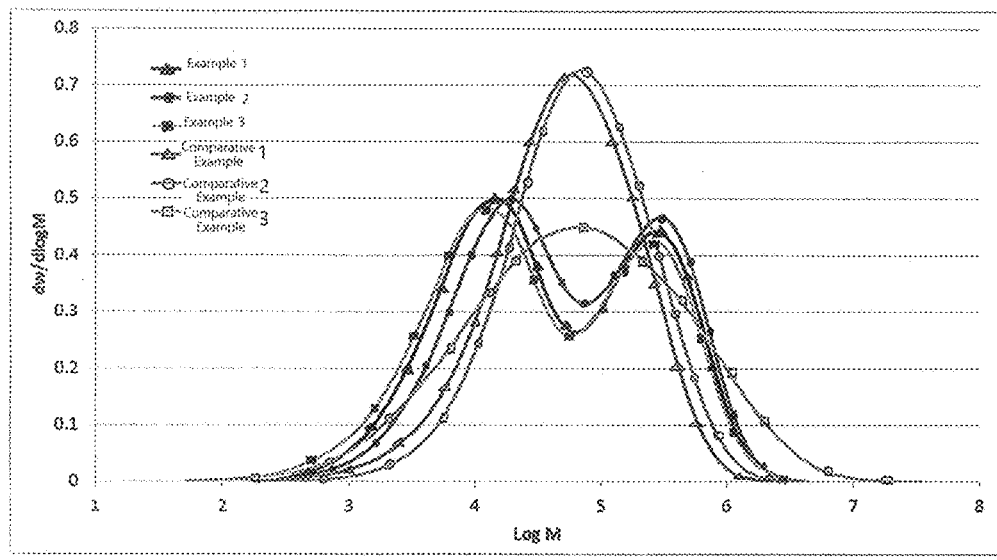
FIG. 9 shows graphs illustrating molecular weight distributions of the polyethylene of the Examples and the Comparative Examples, which are obtained by Gel Permeation Chromatography (GPC).

FIGS. 1 to 3 show CFC data of polyethylenes obtained in Examples 1 to 3 respectively, and FIGS. 4 to 6 show CFC data of polyethylenes obtained in Comparative Examples 1 to 3 respectively. In FIGS. 1 to 6, the horizontal axis represents log value of molecular weight measured by CFC infrared spectroscopy and the vertical axis represents an elusion temperature. Thus, polyethylene having high value in horizontal axis and low value (temperature) in vertical axis is a material having high molecular weight and including greater amount of comonomers. From FIGS. 1 to 6, it can be expected that the polyethylene of Examples has superior mechanical properties and long-term hydraulic pressure endurance properties compared with the polyethylene of Comparative Examples. Further, after carrying out TREF elution test on the polyethylenes of Examples 1 to 3 and Comparative Examples 1 to 3, cumulative elution amount (weight %) of samples in accordance with the temperature was calculated, and the result was shown in FIG. 7, and TREF distribution of elution amount (weight %) of samples in accordance with the temperature was shown in FIG. 8. The molecular weight distribution obtained by Gel Permeation Chromatography (GPC) for the polyethylenes of Examples 1 to 3 and Comparative Examples 1 to 3 were shown in FIG. 9.

What is claimed is:

1. A pipe including a polyolefin resin satisfying all of the following requirements (1) to (7),
   (1) density (d): 0.934 to 0.963 g/cm$^3$,
   (2) melt flow index (MIE, 190° C., 2.16 kg load): 0.01 to 1.0 g/10 minutes,
   (3) ratio of weight-average molecular weight (Mw) and number-average molecular weight (Mn) measured by Gel Permeation Chromatography (GPC) (Mw/Mn, Molecular weight distribution (MWD)): 12 to 60,
   (4) at least two peaks appear when molecular weight of the polyolefin resin is measured with GPC, wherein one peak (MLp) of the at least two peaks indicating the lowest molecular weight appears at 20,000 g/mol or less, and the other peak (MHp) indicating the highest molecular weight appears between 100,000 g/mol and 400,000 g/mol, and
   (5) amount of polyolefin having molecular weight of 10,000 or less exceeds 15 weight % and amount of polyolefin having molecular weight of 1,000,000 or more exceeds 1.5 weight %, when measured with GPC,
   (6) a fail time of the polyolefin resin exceeds 200 hours in a hydraulic pressure endurance test (KS M ISO 1167) and a PENT test (ASTM D1473) under a temperature of 95° C. and a pressure of 3.7 Mpa, and
   (7) the weight-average molecular weight (Mw, measured by Gel Permeation Chromatography (GPC)) of the polyolefin resin is 100,000 to 400,000, and
      wherein the polyolefin resin is prepared by a catalyst composition comprising at least one organometallic compound represented by the following Formula 1, a first at least one organic transition metal compound represented by the following Formula 2, a second at least one organic transition metal compound represented by the following Formula 3, and aluminoxane, $$M^1R^1{}_lR^2{}_mR^3{}_n \quad \text{[Formula 1]}$$

$$M^2R^4{}_pX_q \quad \text{[Formula 2]}$$

$$[R^5\text{-}Q\text{-}R^6]M^2X_2 \quad \text{[Formula 3]}$$

wherein in Formulas 1, 2 and 3,
$M^1$ is an element of Group 1, 2, 12, 13 or 14 in the Periodic Table,
$M^2$ is titanium(Ti), zirconium(Zr) or hafnium(Hf),
$R^1$, $R^4$, $R^5$ and $R^6$ each is independently a cyclic hydrocarbyl group of 5 to 30 carbon atoms having at least 2 conjugated double bonds,
$R^2$ and $R^3$ are independently a hydrocarbyl group of 1 to 24 carbon atoms,
X is a halogen atom,
l is an integer of 1 to the valence of $M^1$,
m and n are independently an integer of 0 to 2, and l+m+n is equal to the valence of $M^1$,
p is an integer of 0 to 2,
q is an integer of 2 to 4,
p+q is equal to the valence of $M^2$,
Q is a divalent group selected from $(CR^7{}_2)_b$, $(SiR^7{}_2)_b$, $(GeR^7{}_2)_b$, $NR^7$ and $PR^7$ which connects $R^5$ and $R^6$, wherein substituents $R^7$ are independently hydrogen atom, hydrocarbonyl group of 1 to 20 carbon atoms, b is an integer of 1 to 4, when Q is $(CR^7{}_2)_b$, $(SiR^7{}_2)_b$, $(GeR^7{}_2)_b$, two substituents $R^7$ connected to carbon(C), silicon(Si), germanium(Ge) are connected to each other to form a ring of 2 to 7 carbon atoms.

2. The pipe as claimed in claim 1, wherein the density (d) is 0.934 to 0.954 g/cm³, the melt flow index (MIE, 190° C., 2.16 kg load condition) is 0.03 to 0.8 g/10 minutes, the ratio of weight-average molecular weight (Mw) and number-average molecular weight (Mn) measured by Gel Permeation Chromatography (GPC) (Mw/Mn, Molecular weight distribution (MWD)) is 13 to 50, amount of polyolefin having molecular weight of 10,000 or less exceeds 20 weight % and amount of polyolefin having molecular weight of 1,000,000 or more exceeds 2.0 weight %.

3. The pipe as claimed in claim 1, wherein at least two peaks appear in TREF (temperature rising elution fractionation) elution test when the polyolefin resin is analyzed by CFC (Cross-Fractionation Chromatography).

4. The pipe as claimed in claim 1, wherein at least 10 weight % is eluted at 80° C. or less in TREF (temperature rising elution fractionation) elution test when the polyolefin resin is analyzed by CFC (Cross-Fractionation Chromatography).

5. The pipe as claimed in claim 1, wherein a shear response (SR) of the polyolefin resin is 50 to 300, and a flow activation energy (Ea) of the polyolefin resin is 25 to 30 kJ/mol.

6. The pipe as claimed in claim 1, wherein the polyolefin resin is a homo-polymer or a copolymer including at least one selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbonadiene, ethylidene norbornene, phenyl norbornene, vinyl norbornene, dicyeclopentadiene, 1,4-butadiene, 1,5-butadiene, 1,5-pentadiene, 1,6-hexadiene, styrene, alpha-methylstyrene, divinylbenzene and 3-chloromethylstyrene.

7. The pipe as claimed in claim 1, wherein a main component of the polyolefin resin is selected from the group consisting of ethylene, propylene and mixture thereof, and an auxiliary component of the polyolefin resin is a material containing 0.01 to 3.0 weight % of structural unit derived from α-olefin of 4 to 10 carbon atoms.

* * * * *